(12) United States Patent  (10) Patent No.: US 7,029,033 B2
Tobata  (45) Date of Patent: Apr. 18, 2006

(54) SEATBELT APPARATUS FOR VEHICLE

(75) Inventor: Hideo Tobata, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 214 days.

(21) Appl. No.: 10/418,136

(22) Filed: Apr. 18, 2003

(65) Prior Publication Data

US 2003/0209900 A1 Nov. 13, 2003

(30) Foreign Application Priority Data

May 10, 2002 (JP) ............ P 2002-136092

(51) Int. Cl.
B60R 22/34 (2006.01)
(52) U.S. Cl. .................................... 280/807
(58) Field of Classification Search ................ 280/807, 280/806, 808, 801.1; 297/474, 475, 476, 297/477; 180/268; 701/36, 45
See application file for complete search history.

(56) References Cited

U.S. PATENT DOCUMENTS

| 4,487,381 | A | * | 12/1984 | Kubota | 242/375.3 |
| 6,257,363 | B1 | * | 7/2001 | Midorikawa et al. | 180/268 |
| 6,431,485 | B1 | * | 8/2002 | Mitsuo et al. | 242/372 |
| 6,485,057 | B1 | * | 11/2002 | Midorikawa et al. | 280/807 |
| 6,561,299 | B1 | * | 5/2003 | Midorikawa et al. | 180/268 |
| 6,702,219 | B1 | * | 3/2004 | Tanji | 242/390.8 |
| 2003/0015864 | A1 | * | 1/2003 | Midorikawa et al. | 280/807 |
| 2004/0193347 | A1 | * | 9/2004 | Harumoto et al. | 701/45 |

FOREIGN PATENT DOCUMENTS

| DE | 100 01 312 A1 | 7/2001 |
| EP | 1361122 A2 * | 11/2003 |
| GB | 2 33 077 A | 7/1999 |
| JP | 6-286581 | 10/1994 |
| JP | 11-20606 | 1/1999 |
| JP | P2000-247211 A | 9/2000 |
| JP | 2000-318567 | 11/2000 |
| JP | P2001-114069 A | 4/2001 |
| JP | 2001-253317 | 9/2001 |

* cited by examiner

Primary Examiner—Faye M. Fleming
(74) Attorney, Agent, or Firm—McDermott Will & Emery LLP

(57) ABSTRACT

A seatbelt apparatus is provided to apply a proper restrictive feeling on passengers, corresponding to traveling condition of a vehicle. In the seatbelt apparatus, on receipt of detection signals from a fore-and-aft acceleration sensor 97 and a left-and-right acceleration sensor 99, a controller 101 controls respective tensions of seatbelts for driver seat and assistant driver's seat individually. Owing to the controller 101, it is established at a vehicle's braking to make a seatbelt tension of the assistant driver's seat larger than that of the driver seat. When the vehicle is turning, it is carried out to make a seatbelt tension of the driver seat larger than that of the assistant driver's seat.

12 Claims, 30 Drawing Sheets

AT CONSTANT-SPEED TRAVELING STRAIGHT

AT ACCELERATING/DECELERATING OR TURNING

DRIVER SEAT

MOVEMENT (FORE-AND-AFT DIRECTION)

MOVEMENT (LEFT-AND-RIGHT DIRECTION)

ASSISTANT DRIVER'S SEAT

MOVEMENT (FORE-AND-AFT DIRECTION)

MOVEMENT (LEFT-AND-RIGHT DIRECTION)

AT BRAKING

AT TURNING

FIG. 30

| TENSION OF BELT | DRIVER SEAT | ASSISTANT DRIVER'S SEAT |
|---|---|---|
| BRAKING | Fd1 | Fa1 |
| TURNING | Fd2 | Fa2 |

Fd1<Fa1 : STRONGER FOR ASSIST. DRIVER'S SEAT AT BRAKING

Fd2>Fa2 : STRONGER FOR DRIVER SEAT AT TURNING

Fa1>Fa2 : STRONGER AT BREAKING THAN TURNING

AT BRAKING

TRAVELING DIRECTION ↑

↑ MOVEMENT OF BODY

C

SB

AT TURNING

TRAVELING DIRECTION ↑

→ MOVEMENT OF BODY

| THRESHOLD VALUE (TIMING) | DRIVER SEAT | ASSISTANT DRIVER'S SEAT |
|---|---|---|
| BRAKING | Td1 | Ta1 |
| TURNING | Td2 | Ta2 |

Td1 > Ta1 : EARLIER FOR ASSIST. DRIVER'S SEAT AT BRAKING

Td2 < Ta2 : EARLIER FOR DRIVER SEAT AT TURNING

Ta1 < Ta2 : EARLIER AT BREAKING THAN TURNING

SEATBELT APPARATUS FOR VEHICLE

BACKGROUND OF THE INVENTION

1. Field of the Invention

The present invention relates to a seatbelt apparatus for a vehicle, such as an automobile.

2. Description of Related Art

Japanese Patent Application Laid-open No. 11-20606 and 2000-318567 each disclose a control device for controlling the operation of automotive restraints (e.g. seatbelt, air bag) for restraining the movements of passengers in a vehicle cabin. In the above publications, the control device is constructed so as to control the action of seatbelts for passengers' seats (driver seat, assistant driver's seat, etc.) or the operation of air bags. In the control device, the operation of a restraint (e.g. seatbelt, air bag) is modified corresponding to a situation whether a passenger related to the restraint has recognized a vehicle collision in advance of the operation of the restraint. Or again, depending on the operation of one of restraints for the driver seat and the assistant driver's seat, the operation of the other restraint is corrected.

SUMMARY OF THE INVENTION

In the conventional device to control the operation of the passenger's restraint, however, it is difficult to make a passenger have proper restraint feeling corresponding to the traveling condition of a vehicle without a sense of incompatibility.

Under the above circumstance, it is an object of the present invention to provide a seatbelt apparatus that can afford a passenger proper restraint feeling in accordance the traveling condition of a vehicle without making the passenger have a sense of incompatibility.

According to the present invention, the above-mentioned object is accomplished by a seatbelt apparatus for a vehicle, comprising a driver seatbelt provided about a driver seat, a passenger seatbelt provided about another passenger's seat except the driver seat, a driver-seatbelt driving mechanism for controlling either a belt tension of the driver seatbelt or a rewind timing of rewinding of the driver seatbelt, a passenger-seatbelt driving mechanism for controlling at least one of a belt tension of the passenger seatbelt and a rewind timing of rewinding of the passenger seatbelt, a driving-condition sensing unit for detecting the driving condition of the vehicle and a control unit connected with all of the driver-seatbelt driving mechanism, the passenger-seatbelt driving mechanism and the driving-condition sensing unit, for controlling the operations of the driver-seatbelt driving mechanism and the passenger-seatbelt driving mechanism, in terms of at least one of respective belt tensions and respective rewind timings of the driver seatbelt and the passenger seatbelt, the control unit adapted to control the driver-seatbelt driving mechanism and the passenger-seatbelt driving mechanism so that holding conditions of the driver seat belt and the passenger seat belt are different from each other.

BRIEF DESCRIPTION OF THE DRAWINGS

FIGS. 6A and 6B are views explaining the action of an acceleration sensing mechanism of the seatbelt apparatus of FIG. 1, in which FIG. 6A shows the same mechanism in its normal state and FIG. 6B shows the same mechanism at vehicle's accelerating/decelerating and turning;

FIGS. 11A and 11B are views explaining the actions of rewinding and releasing a belt, in which FIG. 11A shows a condition that frictional force acts between a ring gear and a lock key and FIG. 11B shows a condition that the frictional force is lowered;

FIGS. 12A and 12B are views a belt-tension retaining mechanism of the seatbelt apparatus of FIG. 1, in which FIG. 12A is a front view showing the whole structure of the same mechanism and FIG. 12B is a sectional view of a solenoid of FIG. 12A;

FIG. 30 is a diagram explaining the relationship of belt tension in accordance with the fifth embodiment of the present invention;

FIG. 32 is a diagram explaining the relationship of action timing of seatbelt in accordance with the sixth embodiment of the present invention.

DESCRIPTION OF THE PREFERRED EMBODIMENT

Referring to accompanying drawings, various embodiments of the present invention will be described below.

Figure 1:
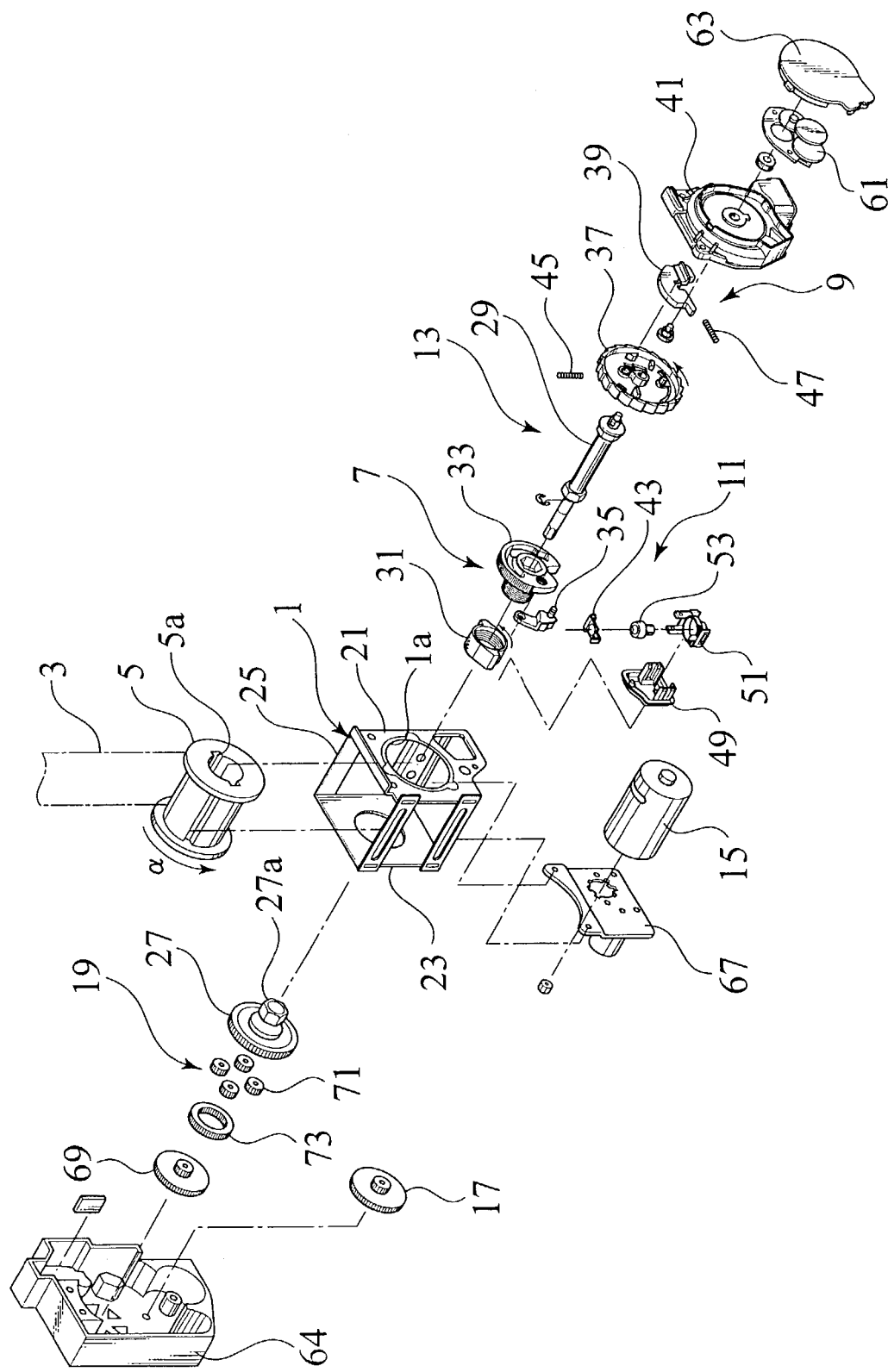
FIG. 1 is an exploded perspective view showing a seatbelt apparatus in accordance with the first embodiment of the present invention.
Figure 2:
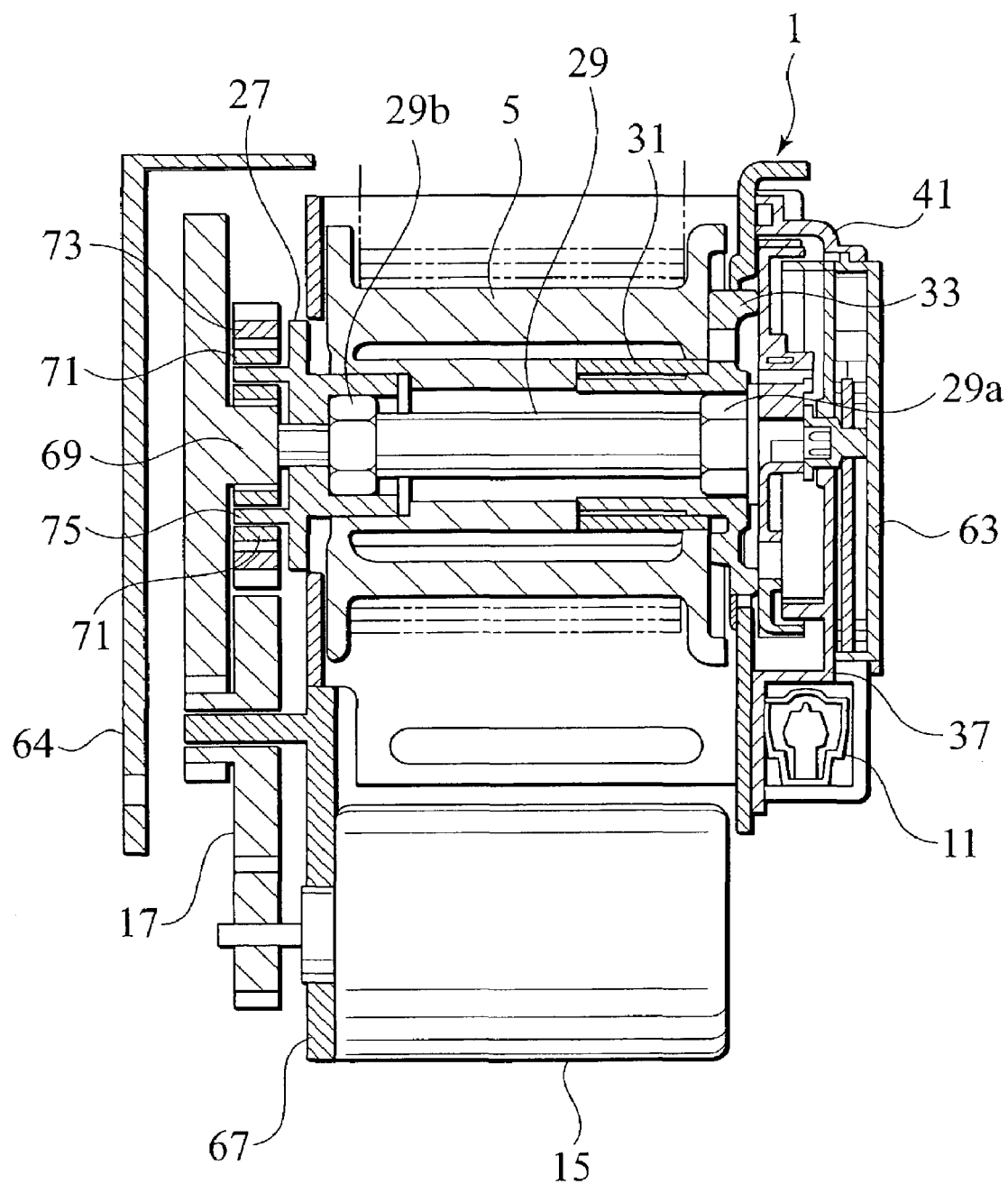
FIG. 2 is a longitudinal sectional view of the seatbelt apparatus of FIG. 1 in its assembled state.

FIG. 1 is an exploded perspective view of a seatbelt apparatus for a vehicle, in accordance with the first embodiment of the present invention. FIG. 2 is a longitudinal sectional view of the same apparatus in its assembled state. It is assumed here that the shown seatbelt apparatus is applied to each of a driver seat and an assistant driver's seat in one form of another seat except the driver seat.

As shown in FIG. 1, the seatbelt apparatus generally includes a frame 1, a reel 5 for rewinding a seatbelt 3, a lock mechanism 7 arranged on one side of the frame 1 (front side of FIG. 1) to retard the rotation of the reel 5 in a direction α to draw the seatbelt 3 from the reel 5, a lock actuating mechanism 9 for actuating the lock mechanism 7 as occasion demands, an acceleration sensing mechanism 11, a force limiting (EA) mechanism 13, a motor 15 arranged on the other side of the frame 1 (back side of FIG. 1) to generate a belt rewinding torque, a reduction gear 17 for reducing a torque of the motor 15 and a planetary gear mechanism 19 for transmitting the reduced torque to the reel 5. The acceleration sensing mechanism 11 is constructed so as to detect various accelerations when the vehicle is accelerating, decelerating and turning to left and right. The force limiting (EA) mechanism 13 operates to limit a load (tension) applied on the seatbelt 3 when the withdrawal of the seatbelt 3 is interrupted by the lock mechanism 7 at the vehicle's abrupt deceleration (e.g. collision)

The frame 1 includes a pair of parallel sidewalls 21, 23 and a back plate 25 connecting the sidewall 21 with the sidewall 23. The reel 5 is disposed between the sidewall 21 and the sidewall 23.

The reel 5 is provided, at a center thereof, with a through-hole 5a penetrating in the axial direction. On the reel's end on the side of the sidewall 23, the through-hole 5a is shaped to have a regular hexagonal section. Thus, it is possible for the through-hole 5a to engage with a hexagonal-shaped shaft 27a of a later-mentioned shaft gear 27. One end of a torsion bar 29 is fitted to the shaft gear 27. Additionally, the reel 5, the shaft gear 27 and the end of the torsion bar 29 can rotate in one body. On the reel's end on the side of the sidewall 21, the through-hole 5a is shaped to have a section allowing a later-mentioned stopper 31 for engagement with the other end of the torsion bar 29 to be fitted to the reel 5. Owing to the formation of the through-hole 5a shaped above, the reel 5 and the stopper 31 are rotatable in one body.

Figure 3:
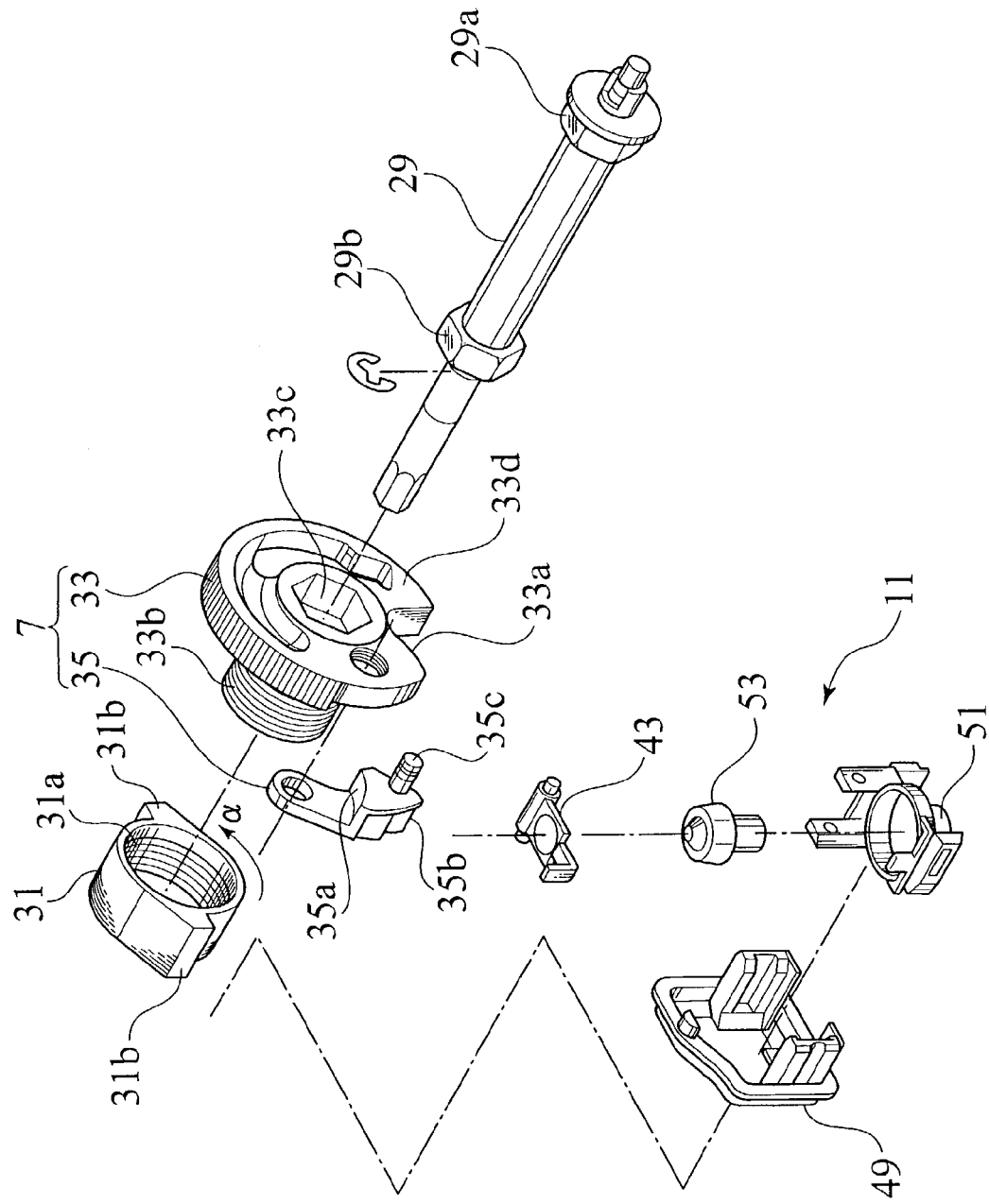
FIG. 3 is an exploded perspective view of a lock mechanism of the seatbelt apparatus of FIG. 1.

As shown in FIG. 3 in enlargement, the lock mechanism 7 includes a locking base 33 and pawl 35. The locking base 33 carries the pawl 35 rotatably and has a load-transmitted part 33a in the form of an arc about a bearing point of the base 33. In the lock mechanism 7, a load from the pawl 35 is transmitted to the locking base 7 through a load transmitting part 35a.

The pawl 35 is provided, on its lower side (in FIG. 3) with an engaging claw 35b and a cam follower 35c in the form of a projecting shaft. With the rotation of the pawl 35, the engagement claw 35b engages with and disengages from inner teeth 1a of the frame 1. When the claw 35b engages with the inner teeth 1a, the reaction force of the pawl 35 is born by the load-transmitted part 33a of the locking base 33.

Figure 4:
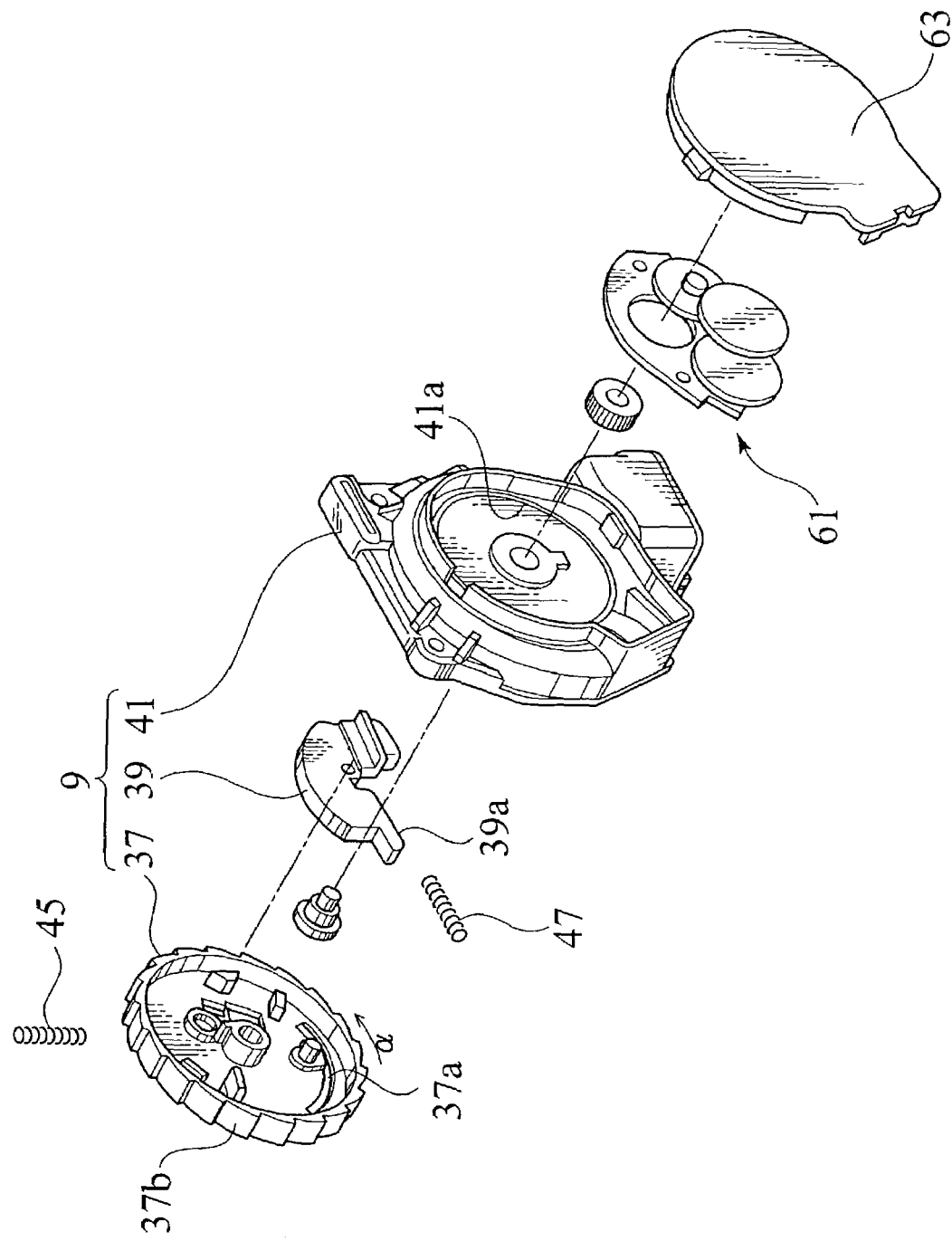
FIG. 4 is an exploded perspective view of a lock actuating mechanism of the seatbelt apparatus of FIG. 1.
Figure 5:
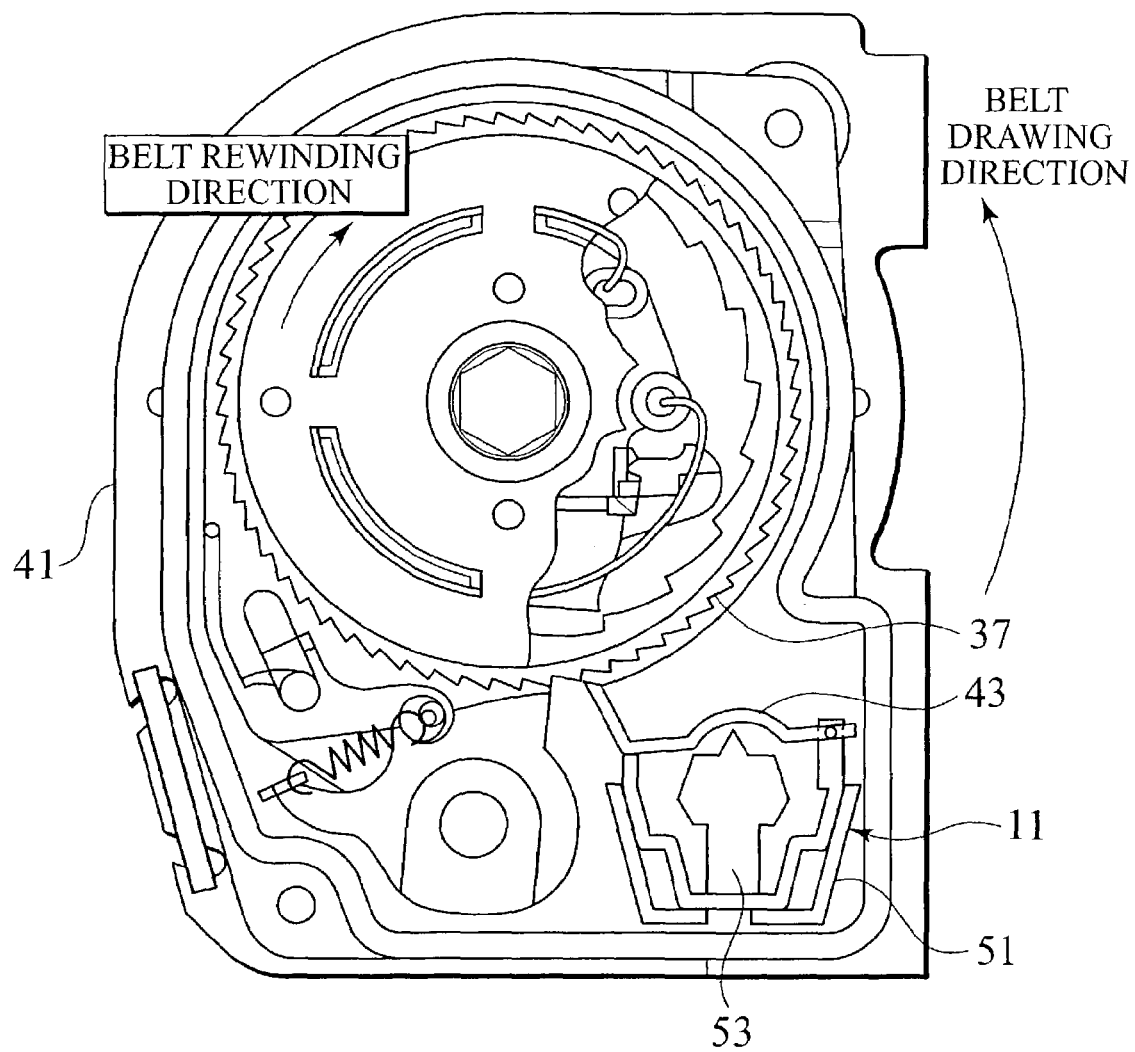
FIG. 5 is a structural view of the lock actuating mechanism in its assembled state, also viewed from the right side of FIG. 4.

As shown in FIGS. 4 and 5, the lock actuating mechanism 9 includes a lock gear 37, a fly wheel 39 and a retainer 41. The lock gear 37 is provided with an arc cam hole 37a into which the cam follower 35c of the pawl 35 is inserted. Therefore, when the lock gear 37 rotates in relation to the locking base 33 relatively, the pawl 35 rotates while the cam follower 35c is guided by the cam hole 37a.

The lock gear 37 holds the fly wheel 39 rotatably. At the leading end of the fly wheel 37, an engagement claw 39a is formed to be engageable with an inner teeth 41a of the retainer 41. On the outer circumferential face of the lock gear 37, a designated number of outer teeth 37b are provided in the form of ratchet gear. The outer teeth 37b in the form of ratchet gear are engaged with an actuator 43 of the acceleration sensing mechanism 11 of FIG. 3, thereby locking the rotation of the lock gear 37 in a direction to draw the seatbelt.

In FIGS. 1 and 4, reference numeral 45 denotes a pawl spring that is compressed between the locking base 33 and the lock gear 37. The pawl spring 45 usually urges both of the locking base 33 and the lock gear 37 in the belt-drawing direction α. Further, reference numeral 47 denotes a flywheel spring that is compressed between the locking gear 37 and the fly wheel 39 to usually urge both of them in the belt-drawing direction α.

The acceleration sensing mechanism 11 includes a housing 49 attached to the sidewall 21 of the frame 1, a sensor casing 51 attached to the housing 49, an inertial mass 53 mounted on the sensor casing 51 and an actuator 43 activated by the inertial mass 53, as shown in FIG. 3.

Figure 6A:
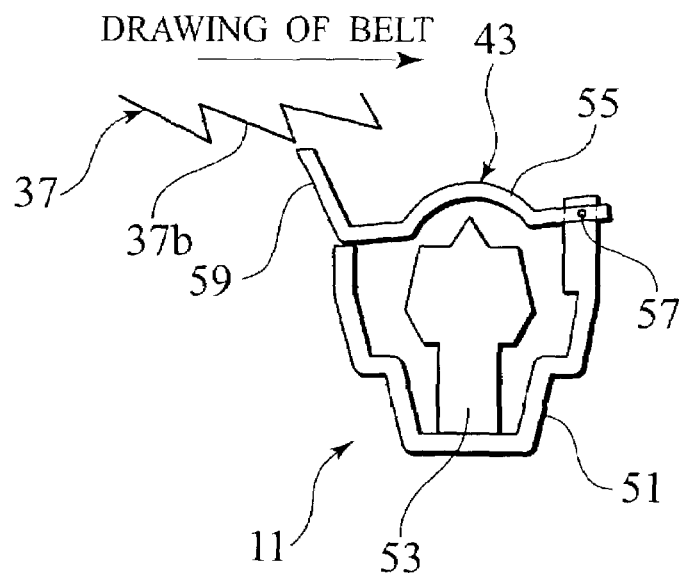
Figure 6B:
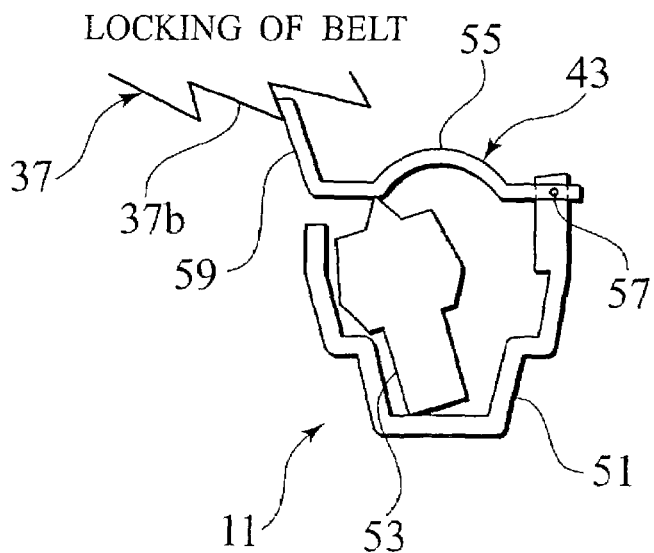

The housing 49 carrying the sensor casing 51 is fitted to the sidewall 21 of the frame 1. The sensor casing 51 carries the actuator 43 rotatably. In the normal state, the inertial mass 53 stands upright, as shown in FIG. 6A. When acceleration/deceleration or centripetal acceleration more than a predetermined value is applied on a driver's vehicle, the inertial mass 53 inclines as shown in FIG. 6B to rotate the actuator 43.

The actuator 43 includes a press part 55 pressed by the inertial mass 53 and an engagement claw 59 arranged on the opposite side of a pivot 57. The engagement claw 59 is engageable with the lock gear 37. In operation, the actuator 43 occupies its lowermost position when the inertial mass 53 stands upright, so that the engagement claw 59 is disengaged from the lock gear 37. To the contrary, when the inertial mass 53 inclines, the engagement claw 59 is rotated upward to engage with the outer teeth 37b of the lock gear 37.

When a designated deceleration is applied on the vehicle, the inertial mass 53 of the mechanism 11 inclines in the fore direction of vehicle, so that the actuator 43 rotates to make the engagement claw 59 engage with the outer teeth 37b of the lock gear 37. Then, an inertia force due to this deceleration causes a passenger to move forward, so that a seatbelt becomes to be likely to be withdrawn. Correspondingly, all of the reel 5, the torsion bar 29, the locking base 33 and the lock gear 37 become likely to rotate in the belt-drawing direction α. However, since the engagement claw 59 engages with the outer teeth 37b to obstruct the rotation of the lock gear 37 in the belt-drawing direction α, the reel 5, the torsion bar 29 and the locking base 33 rotate in the belt-drawing direction α.

Thus, there is produced a relative rotation between the locking base 33 and the lock gear 37, so that the pawl 35 of the lock mechanism 7 rotates to engage the engagement claw 35b of the pawl 35 with the inner teeth 1a of the frame 1. As a result, the rotation of the reel 5 in the belt-drawing direction α is suspended to obstruct the withdrawal of the seatbelt 3. When the seatbelt 3 becomes likely to be drawn furthermore, the torsion bar 29 twists and only the reel 5 rotates in the belt-drawing direction α by a predetermined amount.

When the seatbelt 3 is drawn out at a normal speed, all of the reel 5, the torsion bar 29, the locking base 33 and the lock gear 37 rotate together in the belt-drawing direction α. Further, the fly wheel 39 rotates together with the lock gear 37 while producing no relative rotation therebetween.

When the seatbelt 3 is drawn out abruptly, the fly wheel 39 rotates late for the lock gear 37 to produce a relative rotation therebetween. Therefore, the engagement claw 39a of the fly wheel 39 engages with the inner teeth of the retainer 41, so that the rotation of the lock gear 39 in the belt-drawing direction α is interrupted. Similarly to the above state, the rotation of the reel 5 in the belt-drawing direction α is obstructed as well.

In FIG. 4, reference numeral 61 denotes a reel-rotating volume detecting mechanism that detects the rotation of the torsion bar 29, that is, a rotating amount of the reel 5 in the form of the absolute value and further converts the detected amount into an electrical signal. The mechanism 61 is covered with a cover 63. In FIG. 1, reference numeral 64 designates a cover that covers the sidewall 23 of the frame 1.

The force limiting (EA) mechanism 13 is provided with the torsion bar 29 and a cylindrical stopper 31 screwed on a thread shaft 33b of the locking base 33. In FIG. 3, a torque-transmitting part 29a is formed on one side of the torsion bar 29 to engage with a regular hexagonal hole 33c of the locking base 33 with no relative rotation between the bar 29 and the base 33. The torsion bar 20 further has another torque-transmitting part 29b formed on the other side to engage with the shaft gear 27.

As shown in FIG. 3, the cylindrical stopper 31 has an internal female screw 31a meshing with the thread shaft 33b of the locking base 33. Further, the stopper 31 is provided, on its outer periphery, with two projections 31b to which the rotational torque of the reel 5 is transmitted. Owing to the provision of the projections 31b, the stopper 31 can rotate in one body with the reel 5 and move relatively in the axial direction of the reel 5.

The stopper 31 is capable of rotating in relation to the locking base 33 in the belt-drawing direction α. If there is produced a designated rotational difference between the stopper 31 and the locking base 33 so that the where the reel 5 rotates in relation to the locking base 33 in the belt-drawing direction, then the stopper 31 moves in the axial direction to abut on a disk part 33d of the locking base 33. Further, when the stopper 31 comes into contact with the locking base 33, the axial movement of the stopper 31 is stopped to allow it to rotate in one body with the locking base 33.

Therefore, as the torsion bar 29 can be twisted so long as a rotational difference is produced between the stopper 31 and the locking base 33, the EA mechanism 13 can exhibit so-called force-limiting (EA) function to restrict a load on the seatbelt 3 at a vehicle collision. When the stopper 31 abuts on the locking base 33, the EA mechanism 13 finishes the force-limiting (EA) function. In this way, there is defined a range to effect the force-limiting (EA) function by the stopper 31, the female screw 31a, the locking base 33 and the thread shaft 33b.

Figure 7A:
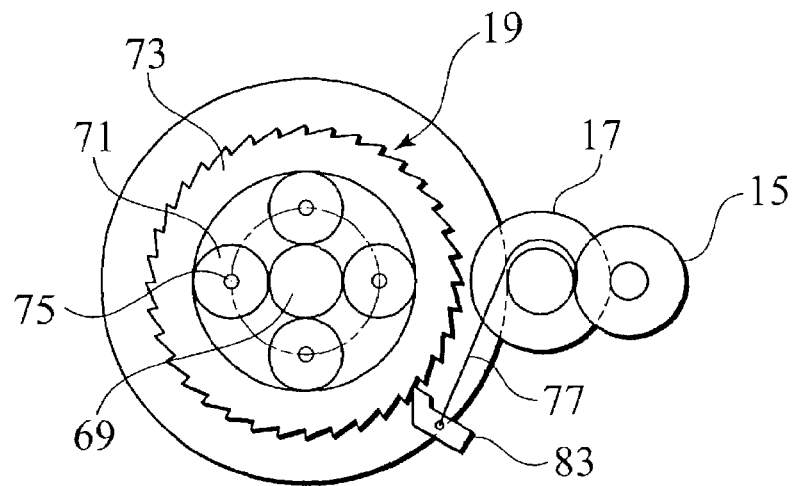
FIG. 7A is a front view showing the structure of a motor-power transmitting mechanism of the seatbelt apparatus of FIG. 1
Figure 7B:
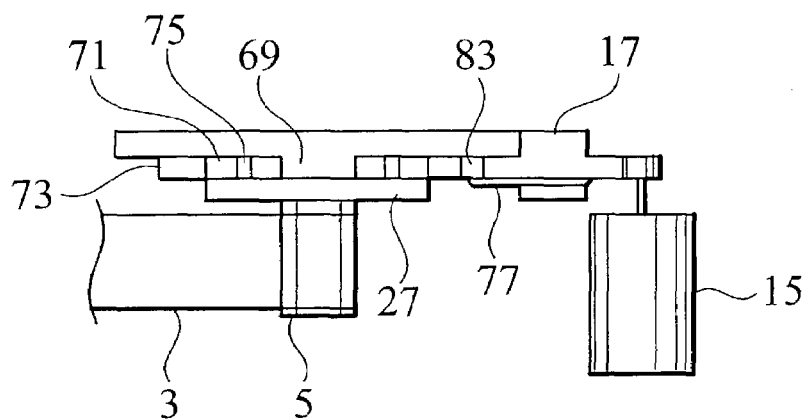
FIG. 7B is a plan view of FIG. 7A.

As shown in FIG. 1, the motor 15 is mounted on the frame 1 through a motor bracket 67. Torque of the motor 15 is transmitted to the reel 5 through the reduction gear 17 and the planetary gear mechanism 19, as shown in FIGS. 7A and 7B.

The rotation of the motor 15 reduced by the reduction gear 17 is inputted to a sun gear 69 of the mechanism 19 and further transmitted to four planet gears 71. If the ring gear 73 is fixed, the rotation of the motor 15 is transmitted to a carrier 75 carrying the planet gears 71, so that a shaft gear 27 is driven to rotate the reel 5, rewinding the seatbelt 3.

Figure 8:
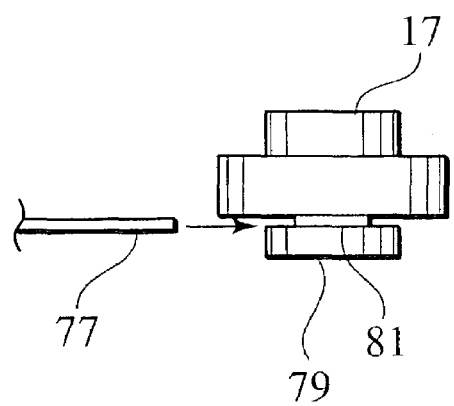
FIG. 8 is an enlarged view showing details of an arm mounting part of FIG. 7.
Figure 9:
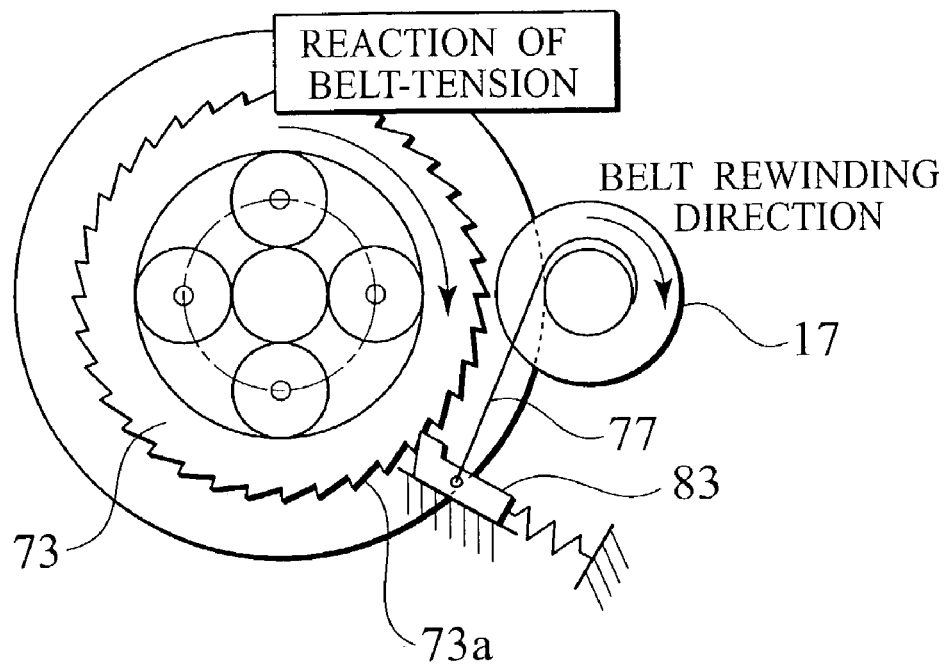
FIG. 9 is a view explaining a belt rewinding action by a motor of FIG. 7.

As shown in FIG. 8, one end of an arm 77 is wound around a shaft part 81 of the reduction gear 17 between its body and a flange 79 while allowing pivotal movement of the arm 77. The other end of the arm 77 is engaged with a lock key 83. When the motor 15 is driven in a direction to rewind the seatbelt 3, as shown in FIG. 9, the lock key 83 moves due to the movement of the arm 77 with the rotation of the reduction gear 17, so that the lock key 83 engages with the ratchet 73a of the ring gear 73. With this engagement, the rotation of the ring gear 73 is fixed. As a result, the rotation of the motor 15 is transmitted to the reel 5, so that the seatbelt 3 is rewound to elevate a tension (belt tension) of the seatbelt 3.

Figure 10:
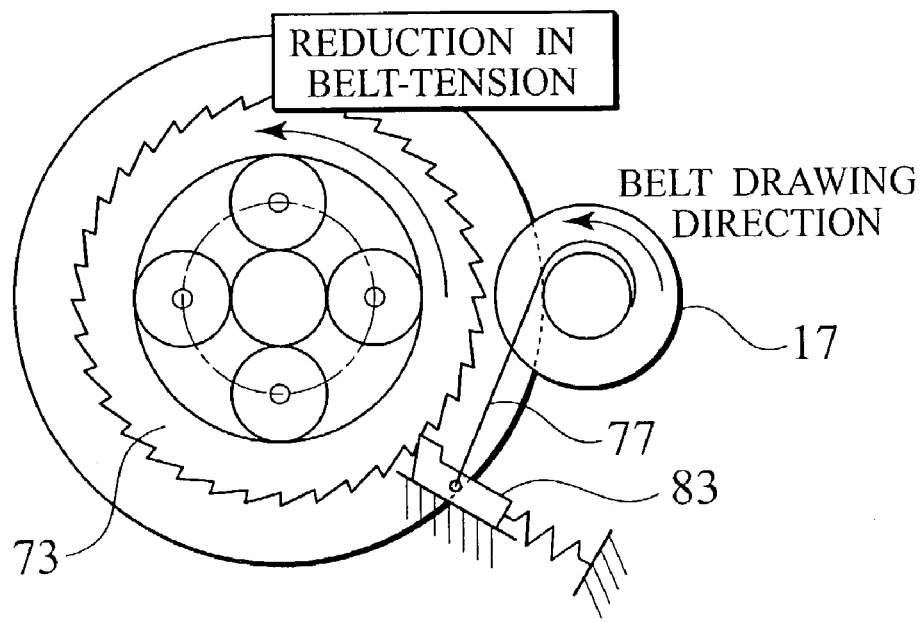
FIG. 10 is a view explaining a belt-tension releasing action by the motor of FIG. 7.
Figure 11A:
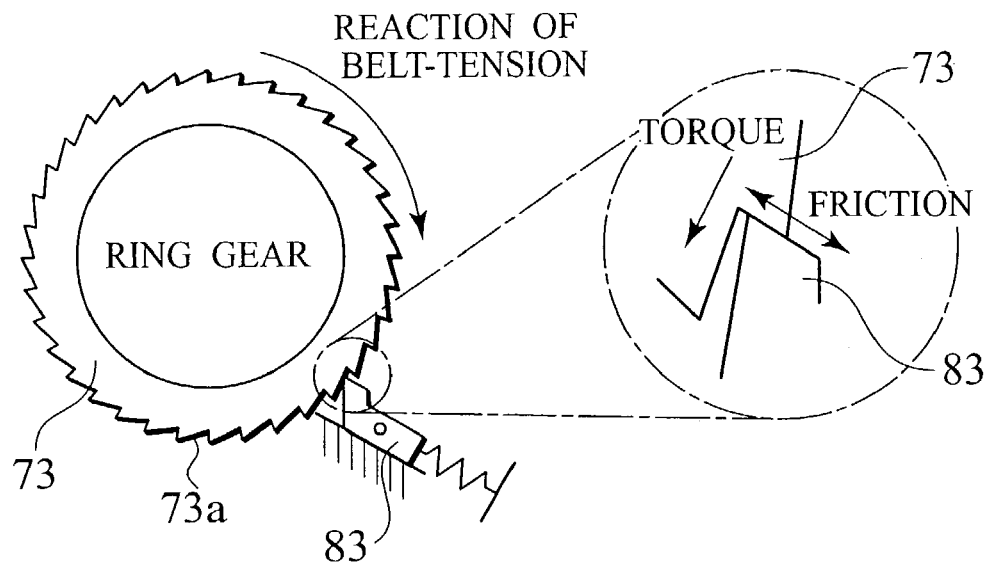
Figure 11B:
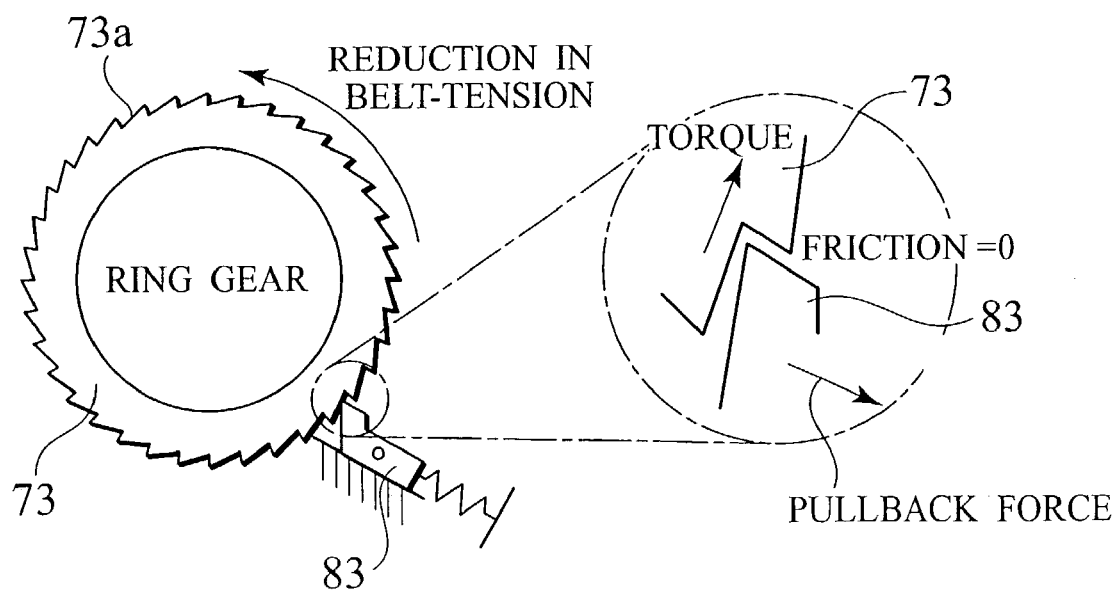

On the other hand, when the motor 15 is rotated in the opposite direction, as shown in FIG. 10, the arm 77 becomes likely to return the lock key 83. Nevertheless, if a specified belt tension is applied on the seatbelt 3, the lock key cannot return due to the action of frictional force between the ratchet 73a and the lock key 83, as shown in FIG. 11A. When the motor 15 is further rotated in the opposite direction, the seatbelt 3 is withdrawn from the reel 5 to lower the belt tension. Consequently, as shown in FIG. 11B, a frictional force between the ratchet 73a and the lock key 83 is reduced, so that the lock key 83 returns the original position.

When the lock key 83 is unlocked to make the ring gear 73 rotate freely, the transmission of torque between the motor 15 and the reel 5 is canceled to lower the belt tension.

In order to maintain the present belt tension, this object may be accomplished by once elevating a tension and continuously stopping the power supply to the motor 15. The measures come from the following background. That is, it is noted that the reduction gear 17 is interposed between the motor 15 and the reel 5 to amplify a torque of the motor 15 and reduce its revolutions. As a result, it becomes possible for the motor 5 to drive the reel 5 in spite of its smallness in torque. Conversely, in order to withdraw the seatbelt 3 from the reel 5, it is necessary to drive the reduction gear 17 forcibly in the reverse order, namely, from the reel 5 to the motor 15, which requires a large force. Therefore, once the supply of electricity to the motor 15 is stopped subsequently to raising the belt tension, a large force is required to change the present belt tension.

It is further noted that the motor 15 is apt to stay at the present position due to its hold torque even when the intensity of an electric current is equal to zero. Therefore, in order to withdraw the seatbelt 3 forcibly, there is required a force by amplifying the hold torque of the motor 15 by a inverse number of the gear ratio of the reduction gear 17. With the establishment of this force, it is possible to maintain the belt tension.

Figure 12A:
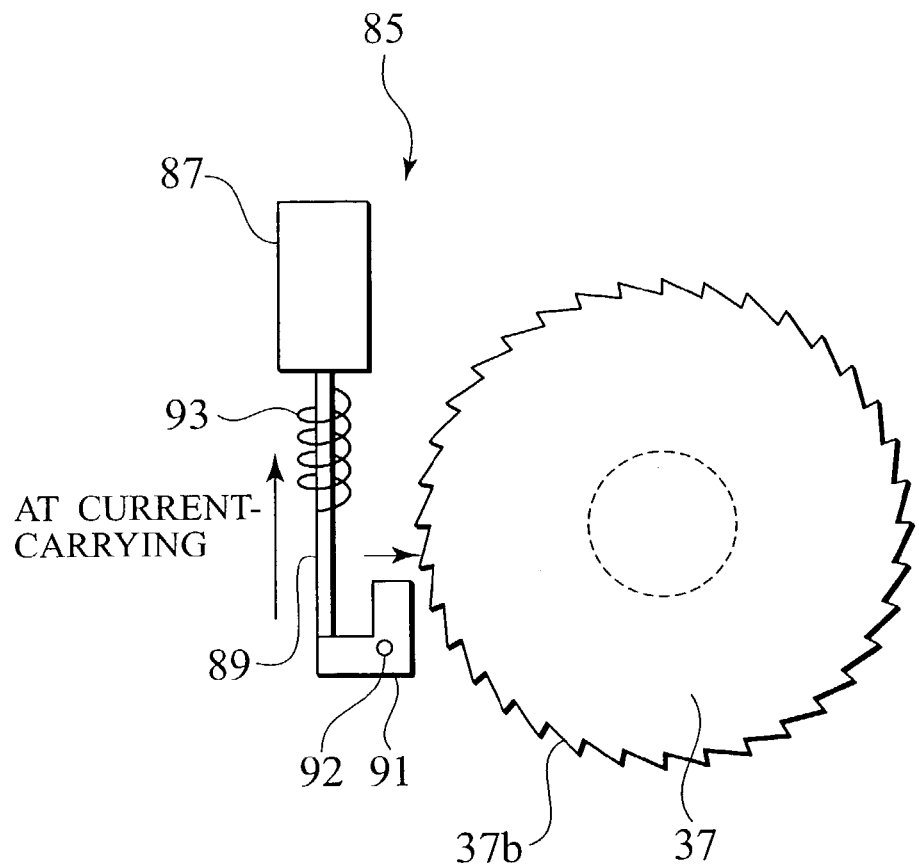

Additionally, if the seatbelt 3 is about to be withdrawn from the reel 5 with a larger force, it is necessary to obstruct the withdrawal of the seatbelt 3 in opposition to the larger force. Under such a situation, the seatbelt apparatus is equipped with a belt-tension holding mechanism 85 shown in FIG. 12A.

Figure 12B:
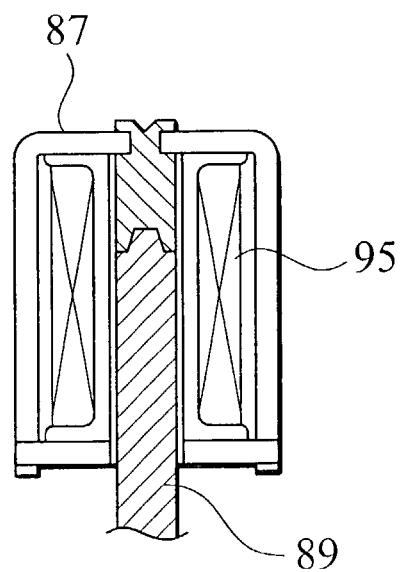

The belt-tension holding mechanism 85 includes a solenoid 87 having a plunger 89 and an engagement claw 91 at the leading end of the plunger 89. The engagement claw 91 is always urged downward in the figure, by a spring 93. When an electric current passes through a coil 95 (FIG. 12B) of the solenoid 87, the plunger 89 rises in opposition to an elastic force of the spring 93, so that the engagement claw 91 rotates about a pivot pin 92 to engage with the outer teeth 37b of the lock gear 37.

When the solenoid 87 is activated in succession to the elevation of the belt tension by the motor 15, the engagement claw 91 engages with the outer teeth 37b, so that the rotation of the lock gear 37 in the direction to draw out the seatbelt 3 is locked up. Thus, even if the seatbelt 3 is about to be withdrawn from the reel 5 with a larger force, it is possible to obstruct the withdrawal of the seatbelt 3, allowing the restriction of a passenger.

Next, the belt-tension control for the seatbelts will be described below.

Figure 13:
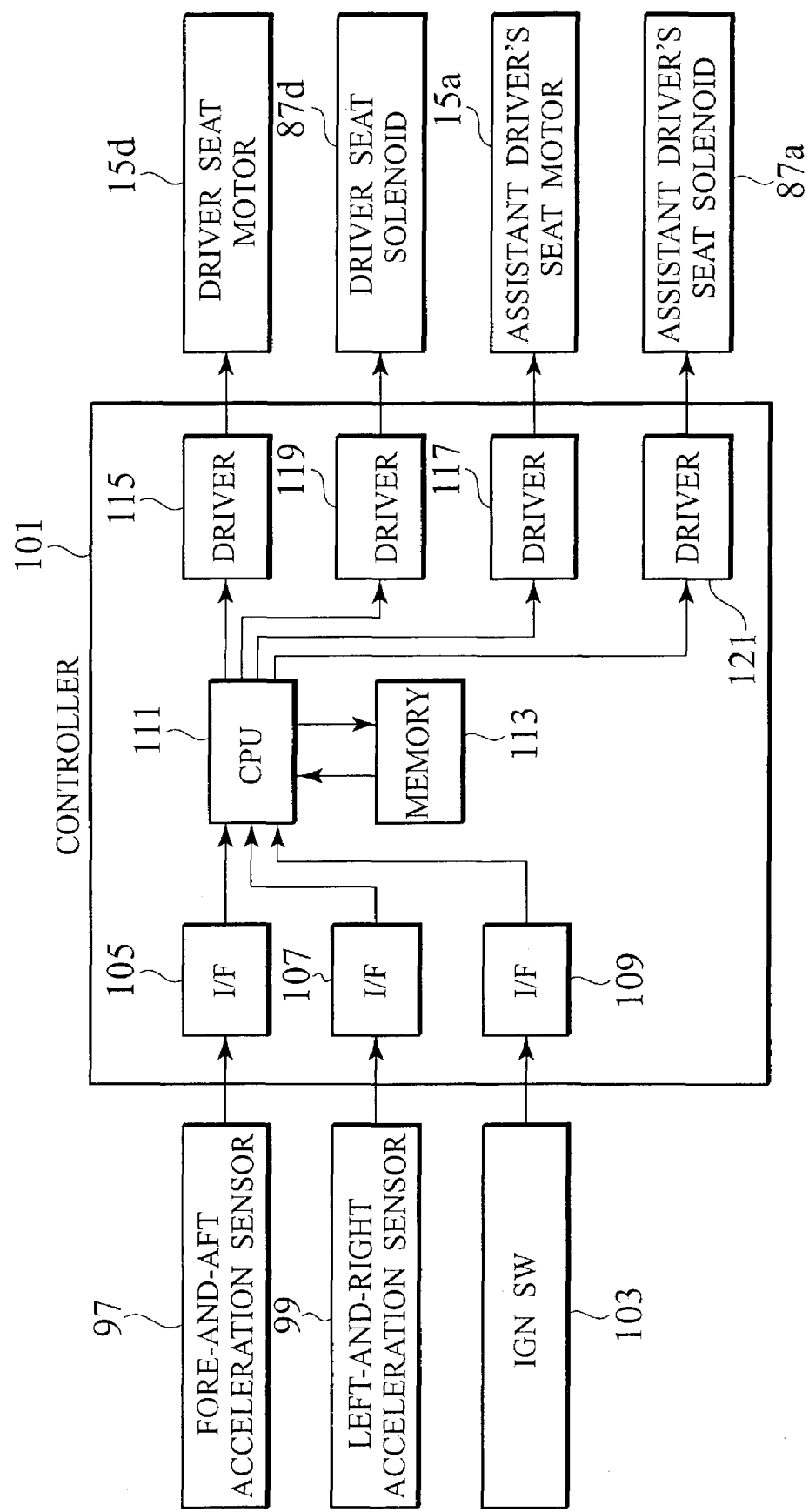
FIG. 13 is a block diagram of a control system of the seatbelt apparatus of FIG. 1.

FIG. 13 is a block diagram of a control system for carrying out the above operation. The vehicle is provided with a fore-and-aft acceleration sensor 97 and a left-and-right acceleration sensor 99 (as the driving-condition sensing unit). These sensors 97, 99 output voltages corresponding to a vehicle's deceleration and centripetal acceleration at vehicle's turning. Further, these sensors 97, 99 correspond to the above acceleration sensing mechanism 11 of FIG. 1. Respective voltage signals from the sensors 97, 99 are inputted to a controller 101 (as control means). Additionally, a detection signal from an ignition switch 103 is inputted to the controller 103 in order to detect the working condition of an engine.

In the controller 101, voltages from the acceleration sensors 97, 99 are converted to digital values by I/F circuits 105, 107 respectively and further inputted to a CPU 111. The detection signal of the ignition switch 103 is also transmitted to the CPU 111 through an I/F circuit 109. The CPU 111 reads out a program stored in a memory 113 and operates in accordance with this program. The CPU 111 further stores calculation data in the memory 113 temporarily.

Corresponding to the detection values from the sensors 97, 99, the CPU 111 calculates respective targeted values in seatbelt tension, which will be called "belt tension" hereinafter, for driver seat and assistant driver's seat. In order to attain the targeted values in seatbelt tension, the CPU 111 controls the operations of driver circuits 115, 117, 119 and 121 for a driver-seat motor 15d, an assistant-seat motor 15a (both corresponding to the above motor 15), a driver-seat solenoid 87d and an assistant-seat solenoid 87a (both corresponding to the solenoid 87 of FIG. 12A), respectively.

Figure 14:
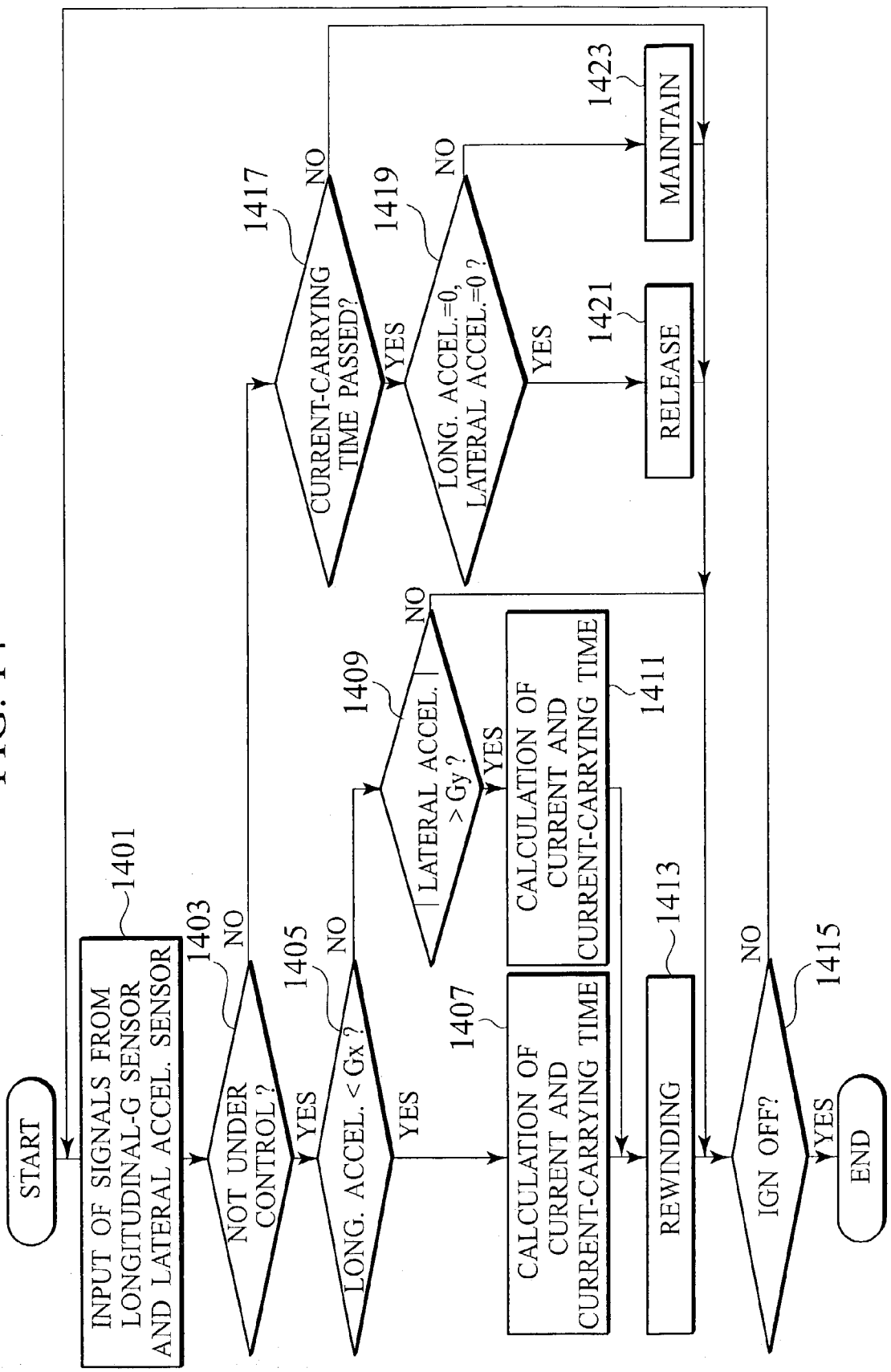
FIG. 14 is a flow chart of a program related to the first embodiment.

The program stored in the memory 113 will be illustrated with the flow chart of FIG. 14.

Subsequently to turn-on of the ignition switch 103, when it is detected that the engine has started, the program is started. At step 1401, it is executed to input the signals from the fore-and-aft acceleration (longitudinal acceleration) sensor 97 and the left-and-right acceleration (lateral acceleration) sensor 99, upon A/D conversion.

Next, at step 1403, it is judged whether the system is not under control now. If the judgment at step 1403 is Yes (not under control), then the routine goes to step 1405 where a value of the fore-and-aft acceleration (longitudinal acceleration) is compared with a threshold value Gx for the fore-and-aft acceleration. When the detected longitudinal acceleration is less than the threshold value Gx, in other words, when a braking acceleration (i.e. deceleration: braking G) is more than the absolute value |Gx|, the targeted tension values of the seatbelts for driver seat and assistant driver's seat are established to perform the control at the vehicle's braking. In order to attain the targeted tension values for the seatbelts, at step 1407, it is executed to calculate respective currents and current carrying-times for the driver-seat motor 15d and the assistant-seat motor 15a.

When the judgment at step 1405 is No (G≧Gx), the control at braking is not carried out because the braking G is small and then the routine goes to step 1409 where a value of the left-and-right acceleration (lateral acceleration) is compared with a threshold value Gy for the lateral acceleration. When the absolute value for a detected lateral acceleration is larger than the threshold value Gy, the targeted tension values of the seatbelts for both driver seat and assistant driver's seat are established to perform the control at the vehicle's turning. In order to attain the targeted tension values for the seatbelts, at step 1411, it is executed to calculate respective currents and current carrying-times for the driver-seat motor 15d and the assistant-seat motor 15a.

On the establishment of the currents and current carrying-times at step 1407 or step 1411, it is executed to distribute the power for the driver-seat motor 15d and the assistant-seat motor 15a at sequent step 1413, performing the rewinding operations for the seatbelts for both driver seat and assistant driver's seat.

On the other hand, if the longitudinal acceleration is more than the threshold value Gx and the absolute value of lateral acceleration is less than the threshold value Gy, the control is not carried out.

Next, at step 1415, it is executed to judge whether the ignition switch 103 is turned off or not. If the judgment at step 1415 is Yes (turn-off), the routine for this program is ended. While, if the ignition switch 103 is turned on (No at step 1415), then the routine returns step 1401 to download the signals from the sensors 97, 99 again.

At next step 1403, it is judged whether the system is not under control now. If the judgment at step 1403 is No (under control), then the routine goes to step 1417 where it is judged whether time has passed the above-established current carrying-times for the driver-seat motor 15d and the assistant-seat motor 15a. If time has not passed the respective current carrying-times (No), the rewinding operations of the seatbelts are maintained.

While, if time has passed the respective current carrying-times (Yes), then the routine goes to step 1419 to judge whether the conditions to release the rewinding operations of the seatbelts are satisfied or not. Here, conditions that both of the longitudinal acceleration and the lateral acceleration are equal to zero are defined as the conditions for releasing the rewinding operations. That is, at the point of completing the vehicle's braking and turning together, the rewinding operations of the seatbelts are released. When the conditions for releasing the rewinding of the seatbelts are satisfied (Yes), the routine goes to step 1421 to carry out the operations to release the rewinding of the seatbelts. While, if the conditions for releasing the rewinding of the seatbelts are not satisfied (No), the routine goes to step 1423 to carry out the operations to maintain respective belt tensions when the rewinding operations of the seatbelts are completed.

The operations to release the rewinding of the seatbelts are accomplished by counter-rotating the driver-seat motor 15*d* and the assistant-seat motor 15*a*, as mentioned with reference to FIG. 10. The operations to maintain the belt tensions are accomplished by continuing to supply the driver-seat motor 15*d* and the assistant-seat motor 15*a* with constant weak currents. That is, without rewinding the seatbelts, their rewinding positions at that time are maintained while preventing the seatbelts from being withdrawn from the reels.

Regarding the tensions of seatbelts for the driver seat and the assistant driver's seat, it is established that, at braking, the belt tension for driver seat becomes less than the belt tension for assistant driver's seat. Further, it is established that, at turning, the belt tension for driver seat becomes more than the belt tension for assistant driver's seat. The reasons are as follows.

It is noted that a passenger on the driver seat is easy to anticipate changes in traveling conditions about the vehicle and can stand ready for the changes because the passenger on the driver seat manipulates the vehicle. For instance, when the passenger finds out an obstacle in front of the vehicle, the judgment whether a vehicle collision should be avoided by quick-braking or quick-steering depends on a driver. On the other hand, a passenger on the assistant driver's seat is hard to anticipate such a driver's judgment and also apt to feel the changes in traveling conditions about the vehicle unexpectedly. Even if the passenger recognizes a vehicle collision, the passenger cannot stand ready for the changes quickly.

Therefore, in spite of similar recognition between the passenger on the driver seat and the passenger on the assistant driver's seat, the bodily movement of the latter passenger due to the passenger's manipulation to avoid the collision becomes larger than that of the former passenger on the driver seat.

Figure 15A:
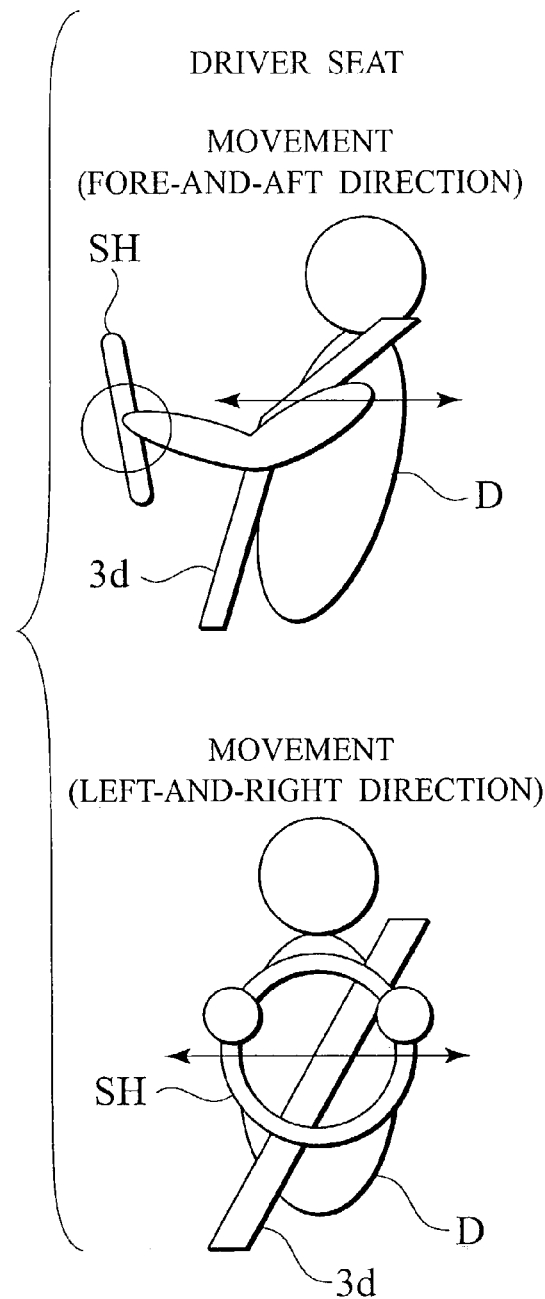
FIG. 15A is a view explaining a distance of a passenger on a driver seat and FIG. 15B is a view explaining a distance of a passenger on an assistant driver's seat.
Figure 15B:
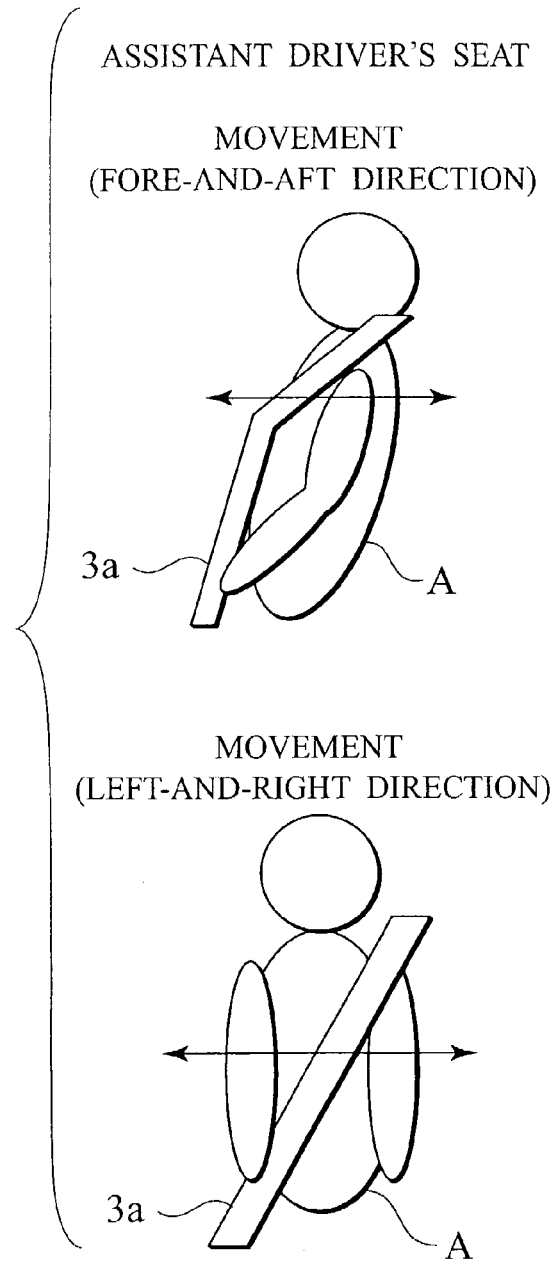

As shown in FIG. 15A, since a passenger D on the driver seat grips a steering wheel SH, the passenger D can hold a passenger's body to same degree owing to the steering wheel SH. While, as shown in FIG. 15B, since there is no more than an assisting grip about a passenger A on the assistant driver's seat, it is difficult for the passenger A to grip the assisting grip when a situation calls for instant reaction. Further, the assisting grip is not sufficient for supporting the body of the passenger A. Thus, the bodily movement of the passenger A on the assistant driver's seat is larger than that of the passenger D on the driver seat. Noted that reference numeral 3*d* of FIG. 15A designates a seatbelt about the driver seat, while reference numeral 3*a* designates a seatbelt about the assistant driver's seat.

Figure 16A:
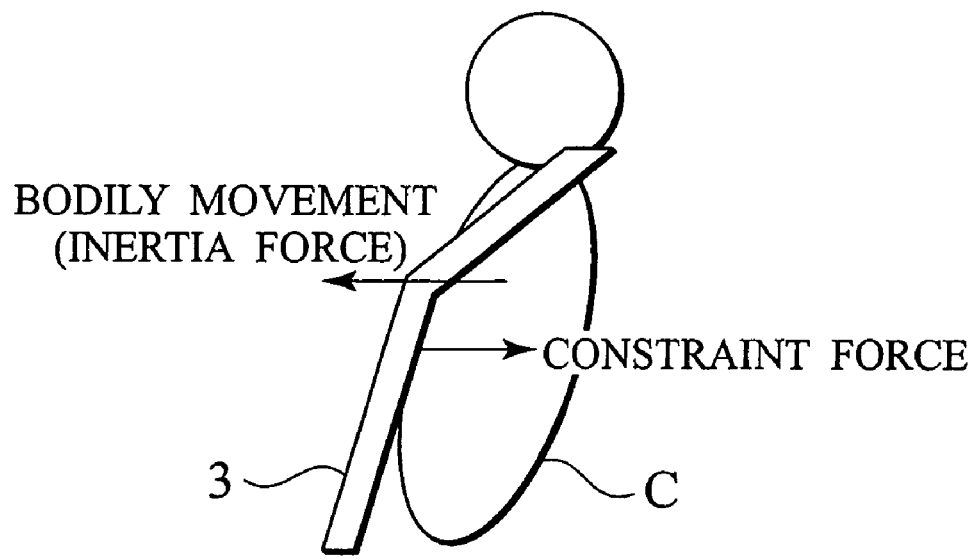
FIG. 16A is a view explaining the relationship between movement of a passenger's body and belt tension at braking and FIG. 16B is a view explaining the relationship between the movement of the passenger's body and the belt tension at turning.

Next, as shown in FIG. 16A, when a passenger D brakes a passenger's vehicle, a passenger's body is moved forward (the left detection of FIG. 16A) by an inertia force. To the contrary, when the tension of the seatbelt 3 is increased, the body of a passenger C is urged against a passenger's seat with the action of a force of constraint in the opposite direction of the above inertia force. That is, to enhance the tension of the seatbelt 3 produces an effect to restrict the forward movement of the passenger C directly.

Figure 16B:
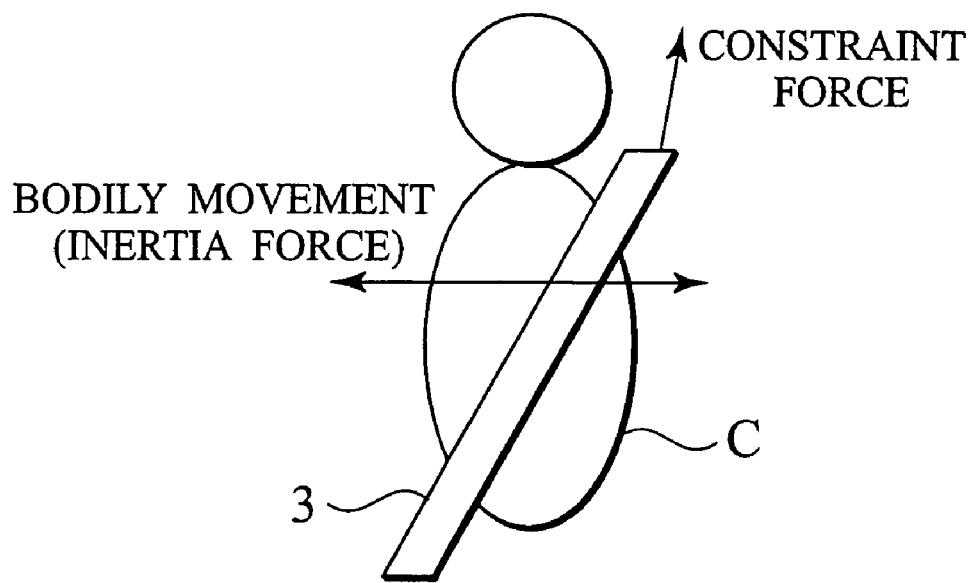

While, as shown in FIG. 16B, when the vehicle turns, the body of the passenger C is moved left or right by an inertia force. To the movements, even if the tension of the seatbelt 3 is increased to enhance the degree of adhesion between the passenger C and the passenger's seat, there is not expected a sufficient effect to restrict the left or right movement of the passenger C since the direction of a constraint force due to the seatbelt 3 is deviated from the direction of the passenger's movements. That is, to enhance the tension of the seatbelt 3 at the vehicle's turning does not produce a great effect to restrict the lateral movement of the passenger C.

In summary, even if the belt tension is enhanced at braking, a passenger on the vehicle is difficult to have a sense of incompatibility since the seatbelt with an increased tension can exhibit an effect to reduce the movement of the passenger. Therefore, if it is established that the tension of a seatbelt for the assistant driver, whose movement at braking is relatively large, becomes higher than that of a seatbelt for the driver seat, then it is possible to reduce the bodily movement of a passenger on the assistant driver's seat. While, since the bodily movement of a passenger on the driver seat is not so large as that of the passenger on the assistant driver's seat, it is established that the tension of the seatbelt for the driver seat becomes smaller than that of the seatbelt for the assistant driver's seat. Such an establishment would not afford the passenger on the driver seat great restrictive feeling.

On the other hand, when the vehicle is turning, the bodily (lateral) movement of the passenger on the assistant driver's seat is apt to be larger than that of the passenger on the driver seat. Under such a situation, even if the tension of the seatbelt for the assistant driver's seat is enhanced, the passenger on the assistant driver's seat could not feel an improved holding capability of the seatbelt despite that the same passenger feels an increased tension of the seatbelt. On the contrary, the bodily (lateral) movement of the passenger on the driver seat is relatively small and further, the same passenger almost never moves in the fore-and-aft direction. Thus, even if the tension of the seatbelt is increased, the passenger on the driver seat would not feel the increased tension of the seatbelt so much and the passenger on the driver seat is easy to feel an improved holding capability of the seatbelt.

Therefore, if it is established that the tension of a seatbelt for the driver at turning becomes higher than that of a seatbelt for the assistant driver's seat, then it is possible to eliminate the possibility that the passenger on the assistant driver's seat has a sense of incompatibility since the holding capability of the seatbelt is not improved so much in spite of an increased tension of the seatbelt. Further, it is possible to allow the passenger on the driver seat to feel that the improved holding capability of the seatbelt is really happening.

In this way, according to the first embodiment of the invention, it is established that, at a vehicle's braking, the tension of a seatbelt for the assistant driver's seat (as a seat except the driver seat) becomes larger than the tension of a seatbelt for the driver seat. Consequently, while reducing the bodily movement of the passenger on the assistant driver's seat, it is possible to prevent the passenger on the driver seat from having an unnecessary constrained feeling. Additionally, it is established that, at a vehicle's turning, the tension of a seatbelt for the driver seat becomes larger than the tension of a seatbelt for the assistant driver's seat. Consequently, while improving the holding capability of the seatbelt for the passenger on the driver seat, it is possible to prevent the passenger on the assistant driver's seat from having an unnecessary constrained feeling.

FIGS. 17 to 21 show the second embodiment of the present invention. In the second embodiment, it is assumed that the constitutions of the seatbelt apparatus and the control system are similar to those of FIGS. 1 to 13 in the first embodiment of the invention.

In this embodiment, it is established that, at a vehicle's braking, the timing of starting to control a seatbelt for an assistant driver's seat precedes the timing of starting to control a seatbelt for a driver seat and also established that, at the vehicle's turning, the timing of starting to control the seatbelt for the driver seat precedes the timing of starting to control the seatbelt for the assistant driver's seat.

The operation of the second embodiment will be described with reference to FIGS. 17 to 19.

Figure 17:
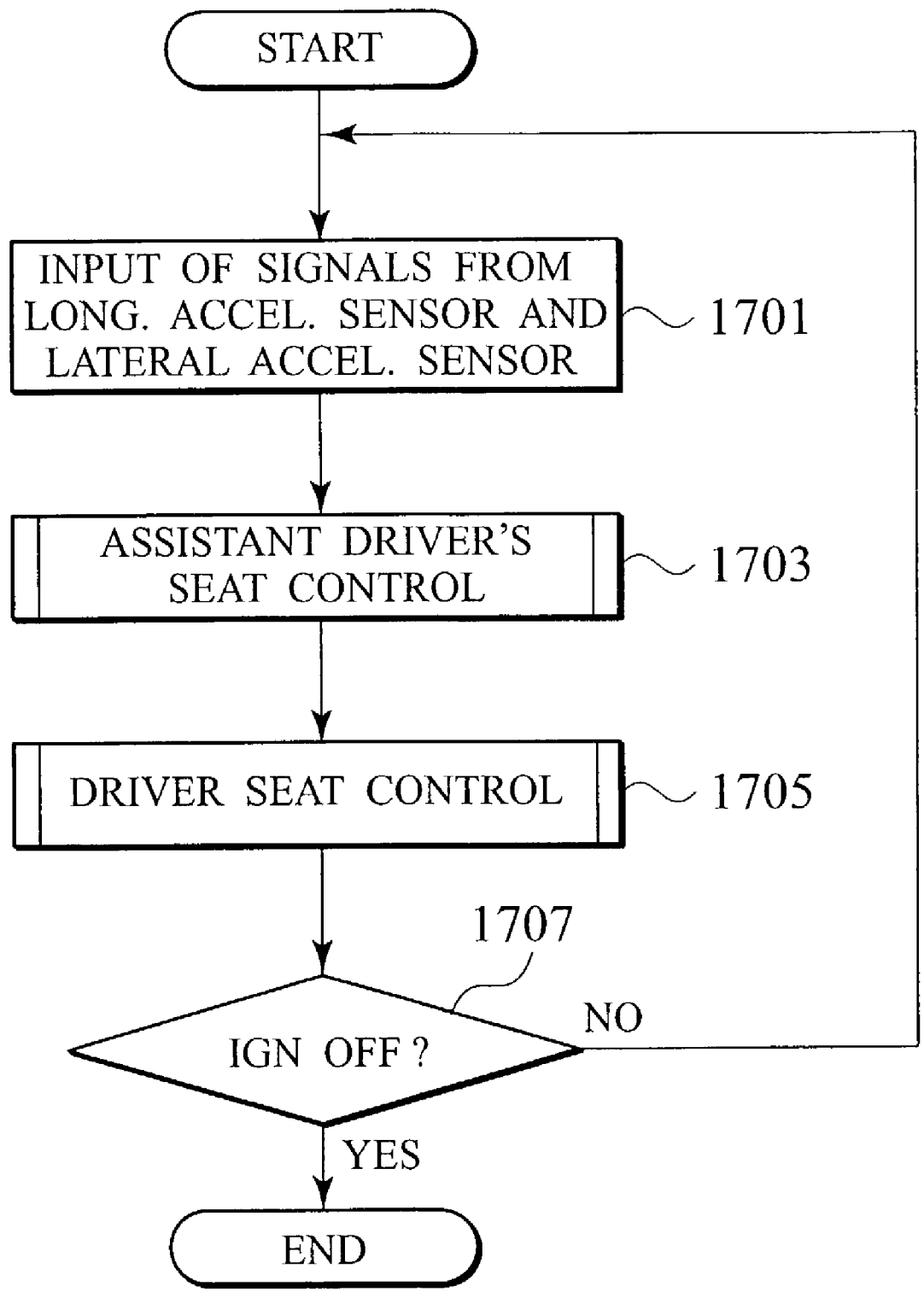
FIG. 17 is a flow chart of the whole program related to the second embodiment of the present invention.

FIG. 17 shows an overall flow chart for carrying out a program of the second embodiment. First of all, when the ignition switch 103 is turned on, the program is started. At step 1701, it is executed to input the signals from the fore-and-aft acceleration (longitudinal acceleration) sensor 97 and the left-and-right acceleration (lateral acceleration) sensor 99. Next, at step 1703, it is executed to perform an assistant driver's seat control mentioned later. Continuously, at step 1705, it is executed to perform a driver seat control also mentioned later. At step 1707, it is executed to judge whether the ignition switch 103 is turned off or not. If the judgment at step 1707 is Yes (i.e. turn-off), then the routine of the program is ended. While, if the judgment at step 1707 is No (i.e. turn-on), then the routine returns step 1701 to input the signals from the sensors 97, 99.

Figure 18:
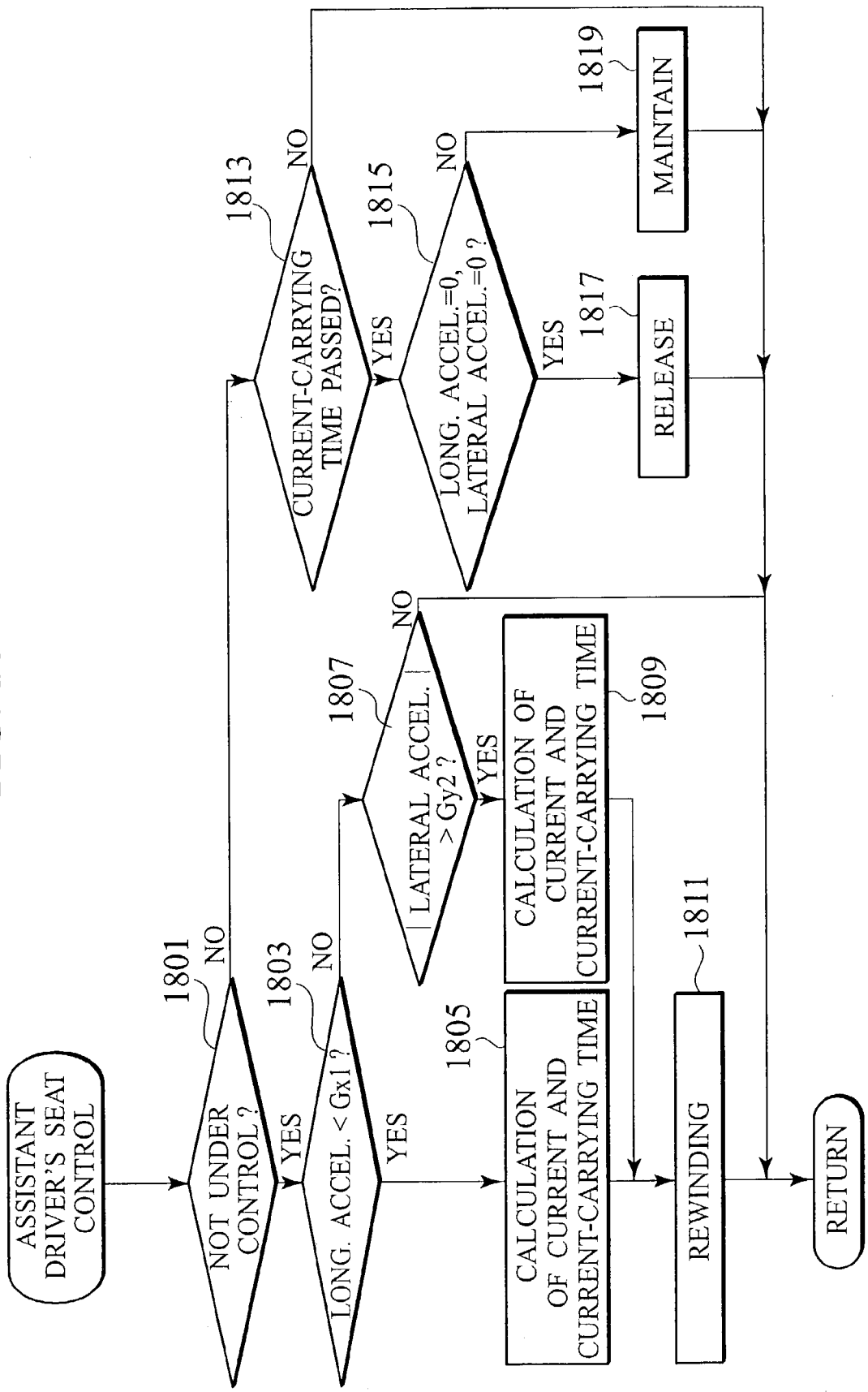
FIG. 18 is a flow chart of the control on the side of an assistant driver's seat related to the second embodiment of the present invention.

FIG. 18 is a flow chart for carrying out the above assistant driver's seat control.

Next, at step 1801, it is judged whether the system for the assistant driver's seat is not under control now. If the judgment at step 1801 is Yes (not under control), then the routine goes to step 1803 where a value of the fore-and-aft acceleration (longitudinal acceleration) is compared with a threshold value Gx1 for the fore-and-aft acceleration. When the detected longitudinal acceleration is less than the threshold value Gx1, in other words, when a braking acceleration (i.e. deceleration: braking G) is larger than the absolute value |Gx1|, the targeted tension value of the seatbelt for the assistant driver's seat is established to perform the control at the vehicle's braking. In order to attain the targeted tension values for the seatbelt, at step 1805, it is executed to calculate both current and current carrying-time for the assistant-seat motor 15a.

If the judgment at step 1803 is No (G≧Gx1; braking G<|Gx1|), then the routine goes to step 1807 where a value of the left-and-right acceleration (lateral acceleration) is compared with a threshold value Gy2 for the lateral acceleration. When the absolute value for a detected lateral acceleration is larger than the threshold value Gy, the targeted tension value of the seatbelt for the assistant driver's seat is established to perform the control at the vehicle's turning. In order to attain the targeted tension value for the seatbelt, at step 1809, it is executed to calculate both current and current carrying-time for the assistant-seat motor 15a. On the other hand, if the absolute value of lateral acceleration (i.e. |Gx1|) is less than the threshold value Gy2, the control is not carried out.

On the establishment of the current and current carrying-time at step 1805 or step 1809, it is executed to distribute the power for the assistant-seat motor 15a at sequent step 1811, thereby starting to rewind the seatbelt for the assistant driver's seat. Subsequently, the routine goes to the overall flow chart of FIG. 17.

Returning step 1801, if the judgment is No (the system for the assistant driver's seat: under control), then the routine goes to step 1813 where it is judged whether time has passed the above-established current carrying-time for the assistant-seat motor 15a. If time has not passed the current carrying-time (No), the rewinding operation of the seatbelt is maintained.

While, if time has passed the current carrying-time (Yes), then the routine goes to step 1815 to judge whether the conditions to release the rewinding operation of the seatbelt are satisfied or not. Here, conditions that both of the longitudinal acceleration and the lateral acceleration are equal to zero are defined as the conditions for releasing the rewinding operation. That is, at the point of completing the vehicle's braking and turning together, the rewinding operation of the seatbelt is released.

When the conditions for releasing the rewinding of the seatbelts are satisfied (Yes), the routine goes to step 1817 to carry out the operation to release the rewinding of the seatbelt. While, if the conditions for releasing the rewinding of the seatbelt are not satisfied (No), the routine goes to step 1819 to carry out the operation to maintain a belt tension when the rewinding operation of the seatbelt is completed. The operation to release the rewinding of the seatbelt and the operation to maintain the belt tension are similar to those of the first embodiment.

Figure 19:
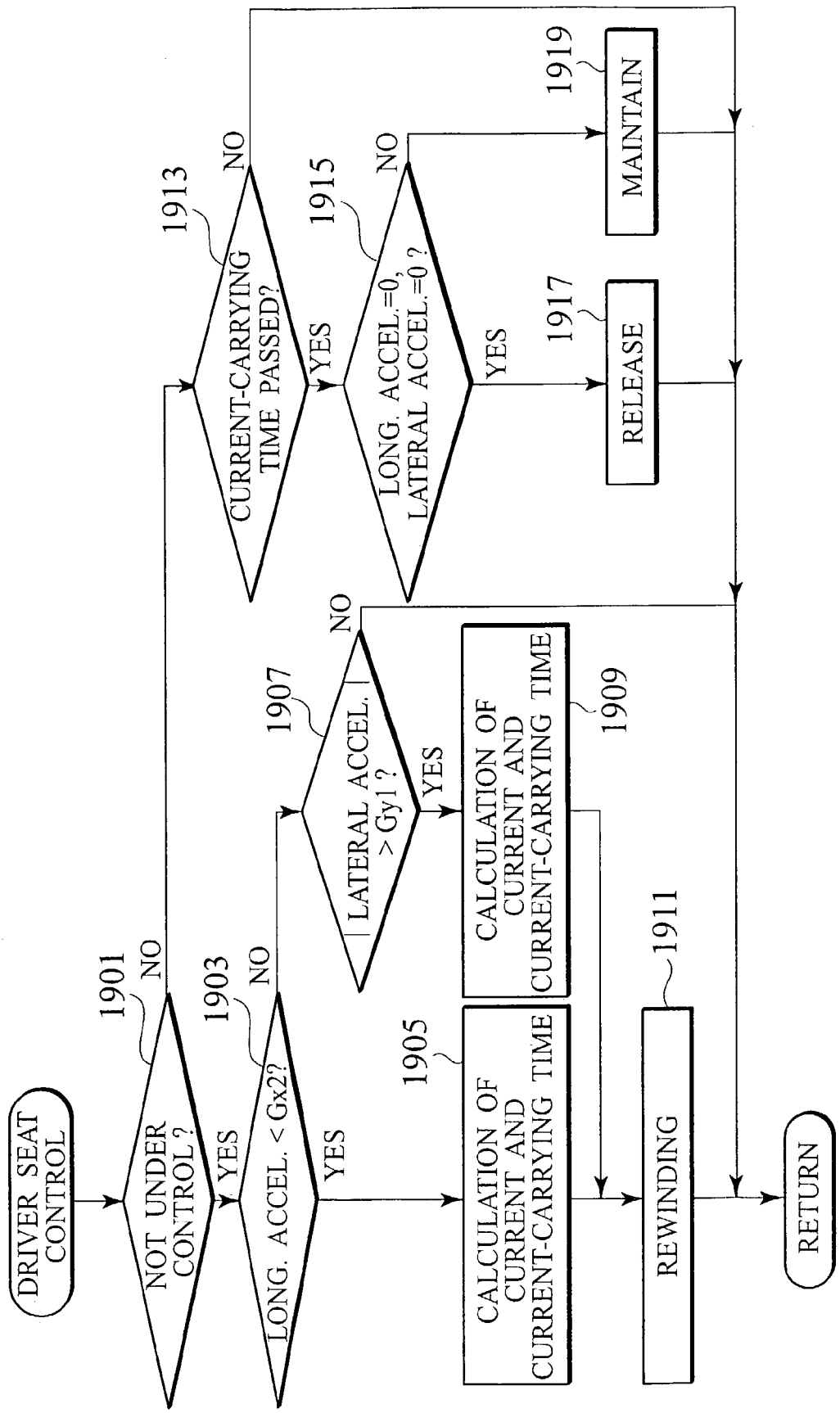
FIG. 19 is a flow chart of the control on the side of a driver seat related to the second embodiment of the present invention.

FIG. 19 is a flow chart for carrying out the above driver seat control.

In the flow chart, the contents of the driver seat control are similar to the contents of the above-mentioned assistant driver's seat control of FIG. 18 except both threshold values of the longitudinal acceleration and the lateral acceleration are changed to Gx2 and Gy1, respectively.

Figure 20:
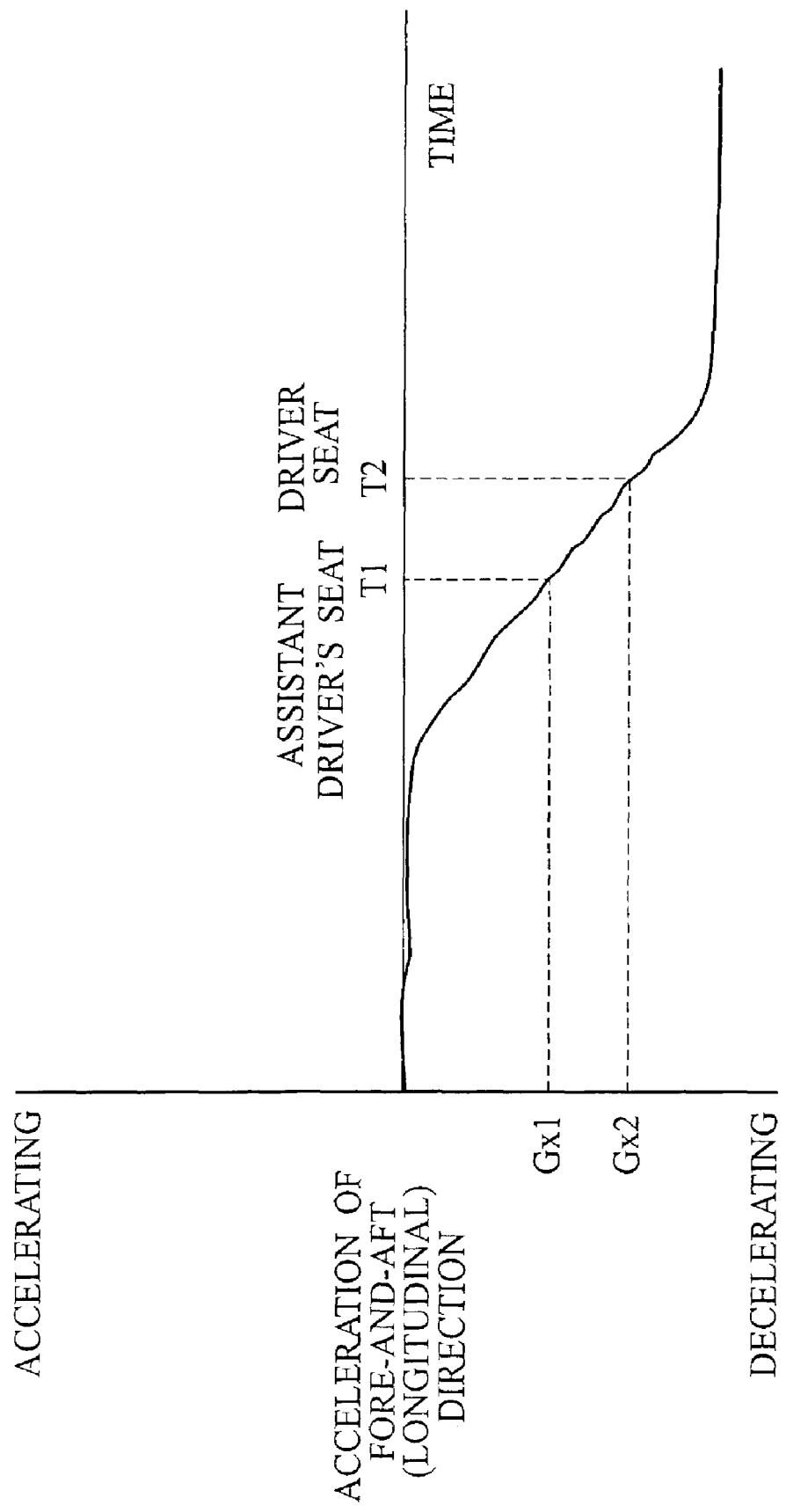
FIG. 20 is a correlation diagram between a threshold value in fore-and-aft acceleration at braking and a threshold value to start the seatbelt control in accordance with the second embodiment of the present invention.

FIG. 20 shows the relationship between the threshold value Gx1 for the assistant driver's seat and the threshold value Gx2 for the driver seat. According to this embodiment, at braking, the threshold value Gx2 for the driver seat is set to be smaller (i.e. large deceleration) than the threshold value Gx1 for the assistant driver's seat. Consequently, the timing T1 of starting to control the seatbelt for the assistant driver's seat is hastened to the timing T2 of starting to control the seatbelt for the driver seat.

As a result, it is possible to restrict a passenger's body on the assistant driver's seat at the beginning of the vehicle's braking, that is, its initial stage where the bodily movement is relatively small, whereby the passenger's body can be prevented from moving largely. On the other hand, since a passenger on the driver seat can stand ready for the vehicle's braking by oneself, the displacement of the passenger's body is small at the beginning of the vehicle's braking. Thus, by enhancing the tension of seatbelt at the point when the deceleration gets larger, it is possible to prevent the displacement of the passenger's body from getting larger. Since the control about the driver seat is started later than that about the assistant driver's seat, there is no possibility to afford the driver unnecessary constraint.

Figure 21:
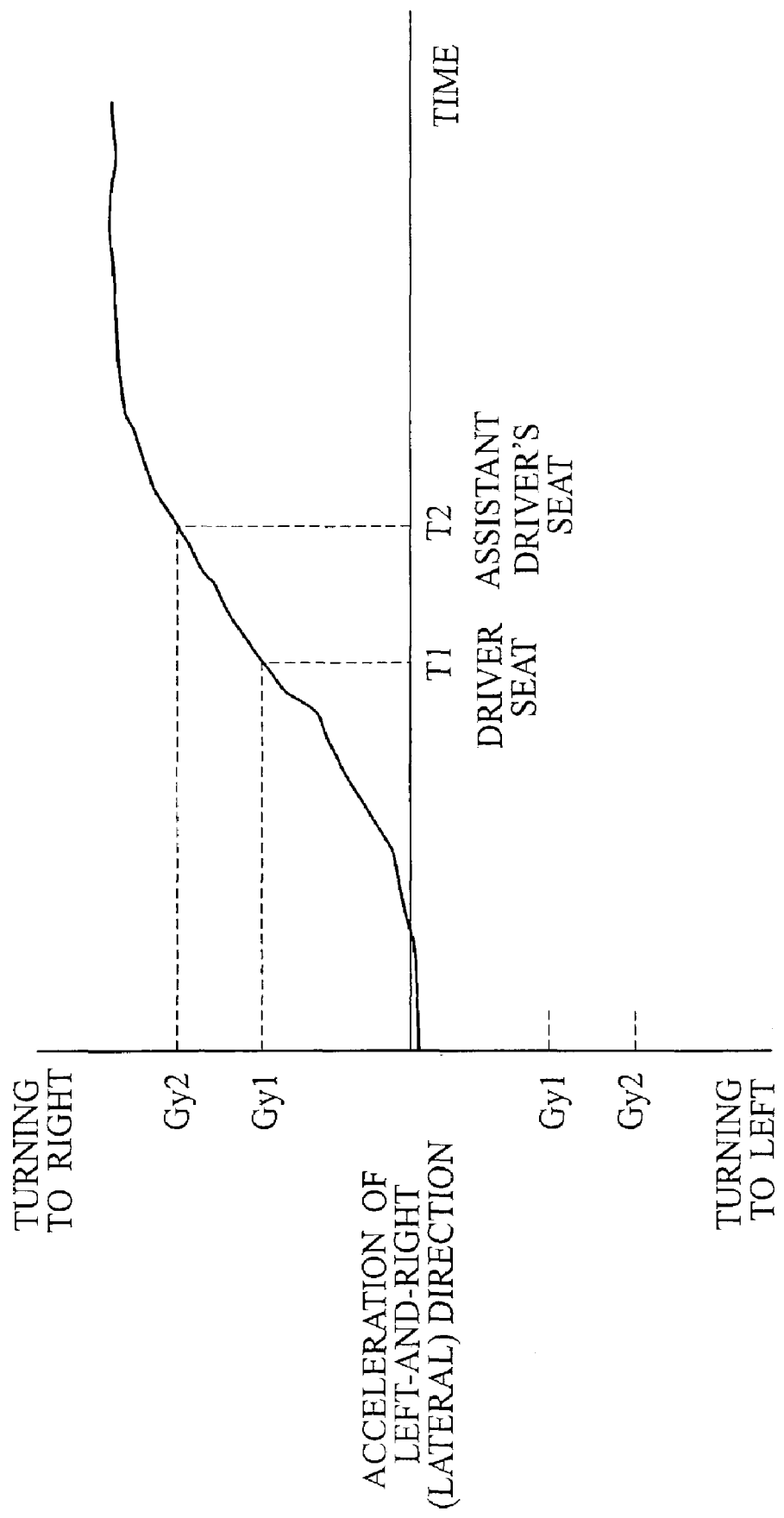
FIG. 21 is a correlation diagram between a threshold value in left-and-right acceleration at turning and a threshold value to start the seatbelt control in accordance with the second embodiment of the present invention.

FIG. 21 shows the relationship between the threshold value Gy1 (of lateral acceleration) for the driver seat and the threshold value Gy2 for the assistant driver's seat. According to this embodiment, at turning, the threshold value Gy1 for the driver seat is set to be smaller than the threshold value Gy2 for the assistant driver's seat. Consequently, the timing T1 of starting to control the seatbelt for the driver seat is hastened to the timing T2 of starting to control the seatbelt for the assistant driver's seat.

Consequently, since the control of seatbelt for the driver seat is started at the beginning of the vehicle's turning, the passenger on the driver seat can feel an improvement in holding capability of the seatbelt. Additionally, as the passenger's body on the driver seat does not move largely, the passenger on the driver seat would not feel the tension of seatbelt being too intensive. On the other hand, as the lateral acceleration is small at the beginning of the vehicle's turning and a passenger on the assistant driver's seat might have sense of discomfort caused by an excessive constraint force of the seatbelt rather than an effect to restrain the bodily movement, the control of seatbelt for the assistant driver's seat is not yet carried out at this stage. At the subsequent stage where the lateral acceleration gets larger, it has to give the effect to restrain the bodily movement priority over the consideration against the sense of discomfort caused by an excessive constraint force of the seatbelt. For this reason, the seatbelt control is started at this stage.

In this way, according to the second embodiment, since the timing of drawing the seatbelt for the assistant driver's seat is hastened to the timing of drawing the seatbelt for the driver seat at the vehicle's braking, it is possible to prevent the application of unnecessary constrained feeling on a passenger on the driver seat while restricting the bodily movement of a passenger on the assistant driver's seat. While, since the timing of drawing the seatbelt for the driver seat is hastened to the timing of drawing the seatbelt for the assistant driver's seat at the vehicle's turning, it is possible to prevent the application of unnecessary constrained feeling on the passenger on the assistant driver's seat while improving the holding capability of seatbelt for the passenger on the driver seat.

Further, since the tension of seatbelt for the assistant driver's seat is set larger than that of seatbelt for the driver seat at the vehicle's braking, it is possible to progress an effect of preventing the bodily movement of a passenger on the assistant driver's seat from increasing and also possible to prevent the constrained feeling against the passenger on the driver seat from being enhanced unnecessarily. Again, since the tension of seatbelt for the driver seat is set larger than that of seatbelt for the assistant driver's seat at the vehicle's turning, it is possible to prevent the application of unnecessary constrained feeling on the passenger on the assistant driver's seat while improving the holding capability of seatbelt for the passenger on the driver seat.

Figure 22:
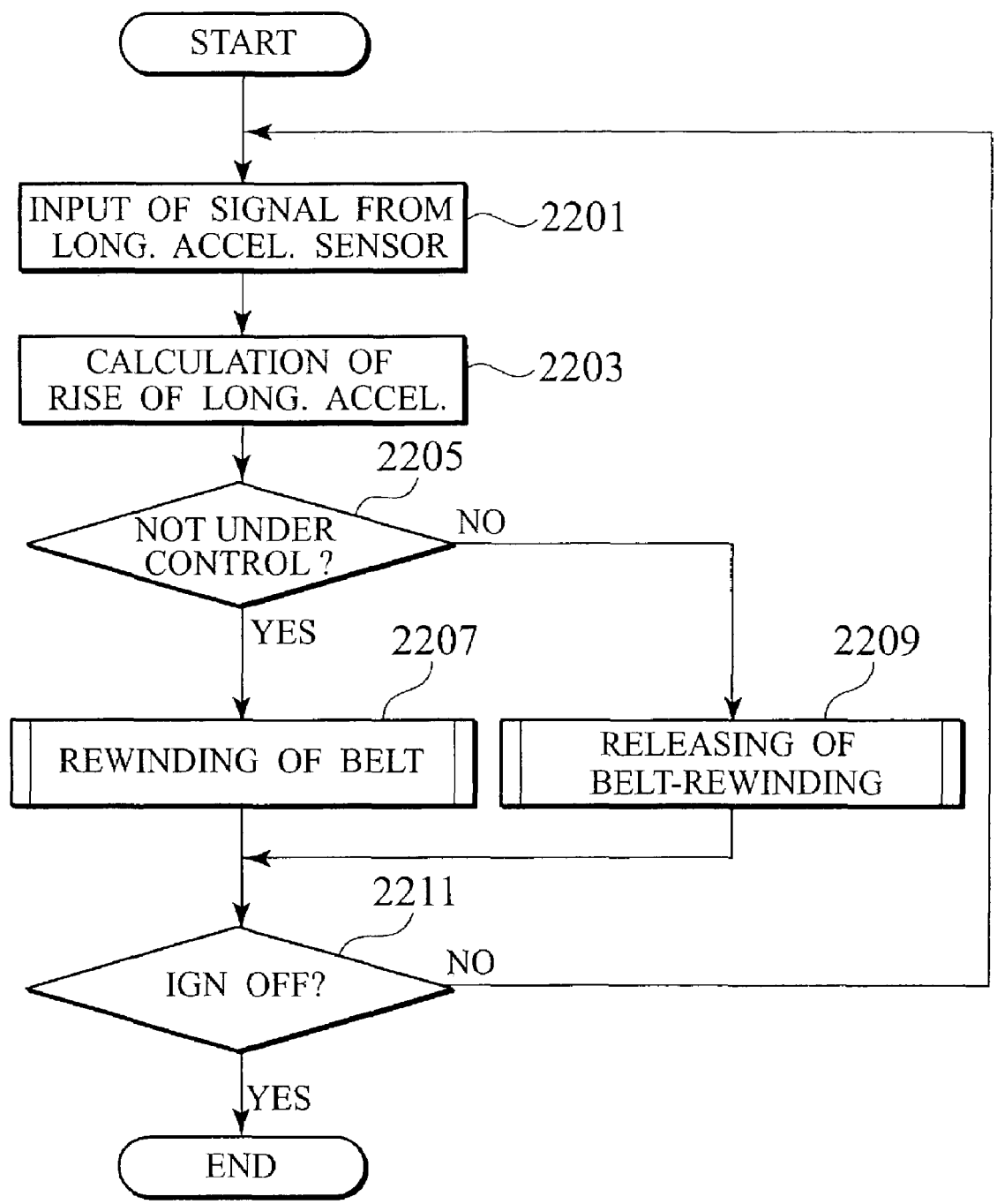
FIG. 22 is a flow chart of the whole program related to the third embodiment of the present invention.
Figure 23:
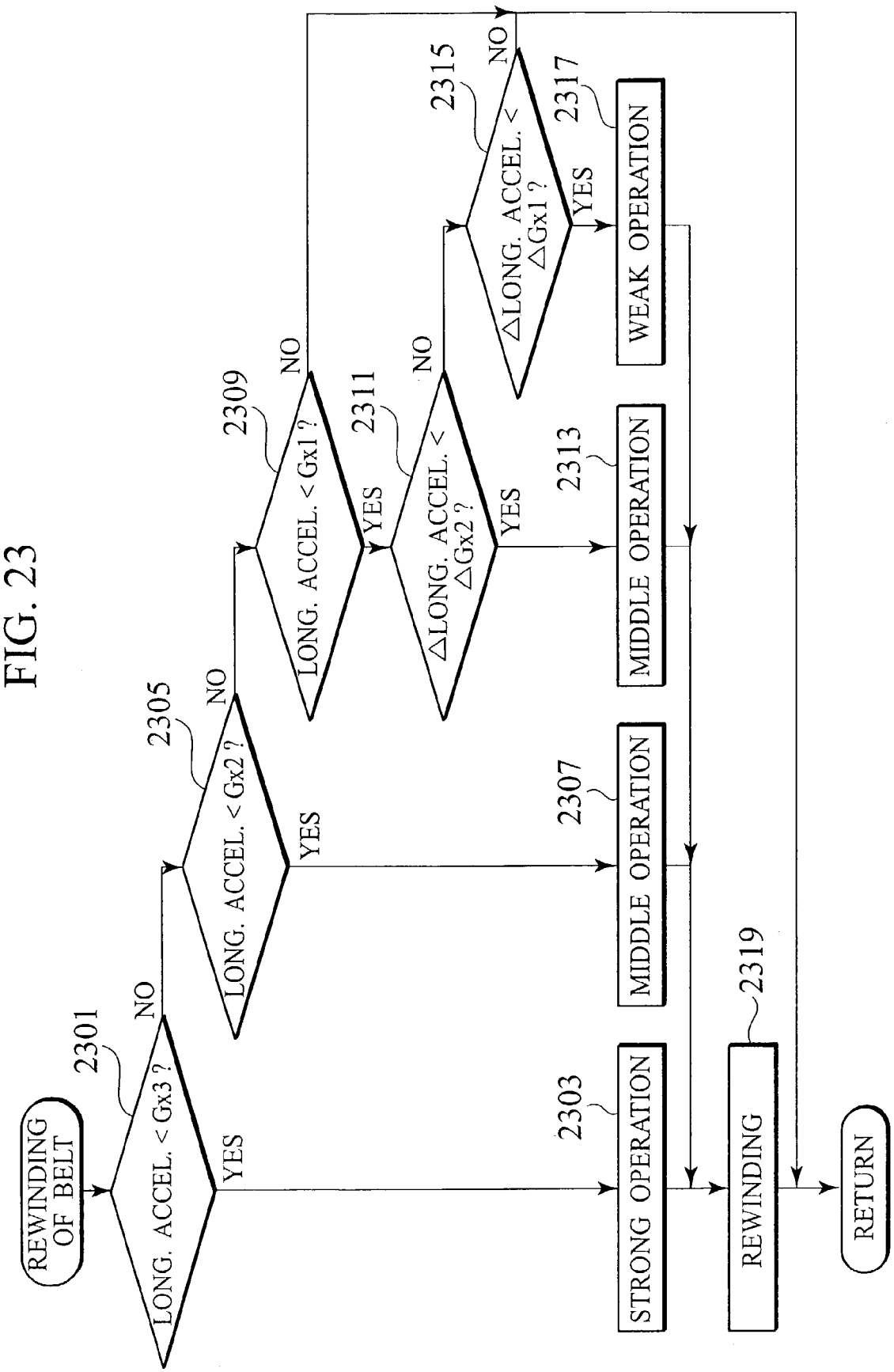
FIG. 23 is a flow chart showing a belt-winding operation in the third embodiment of the present invention.
Figure 24:
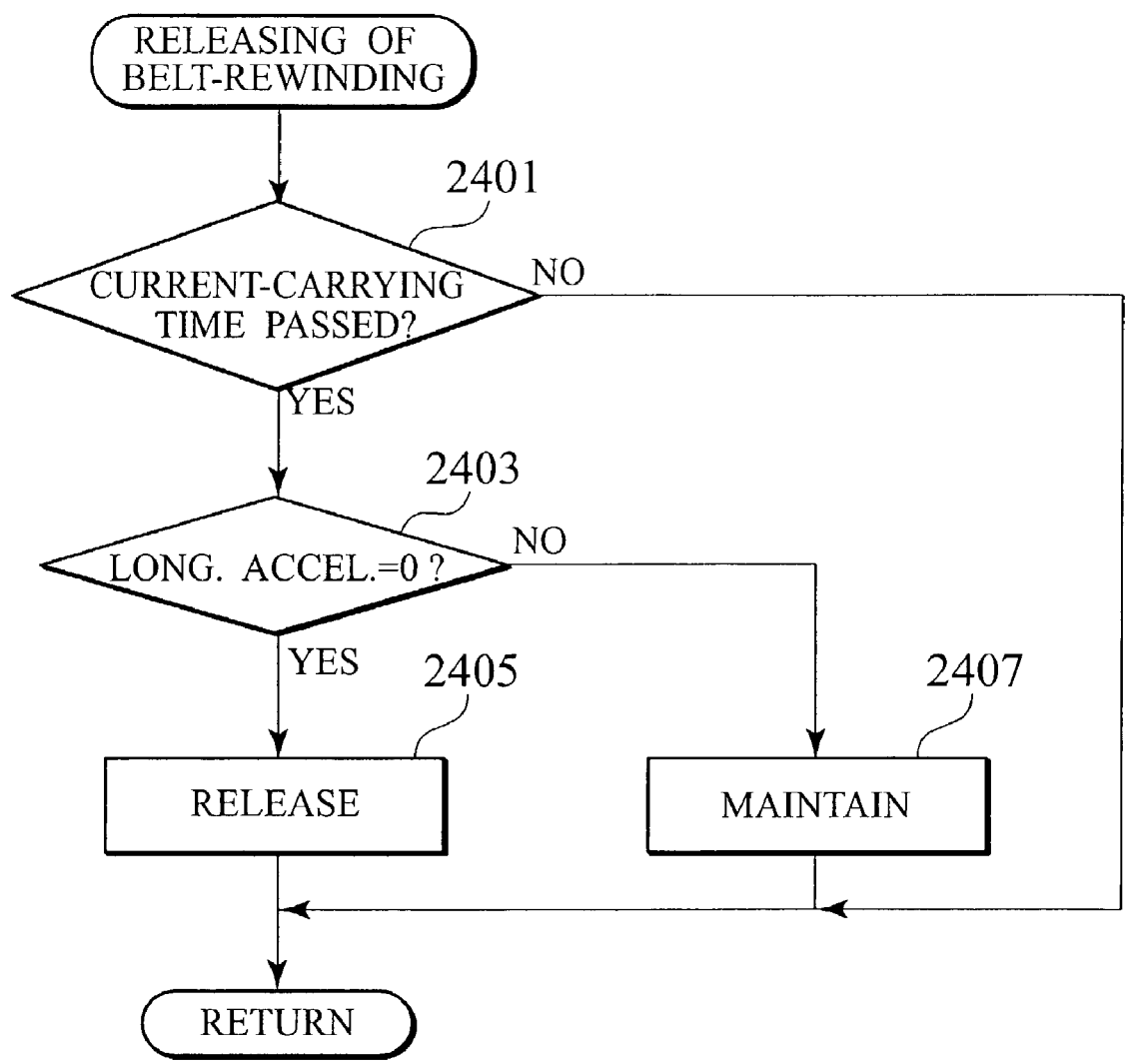
FIG. 24 is a flow chart showing a belt-winding releasing operation in the third embodiment of the present invention.

FIGS. 22 to 24 show the third embodiment of the present invention. Also in the third embodiment, it is assumed that the constitutions of the seatbelt apparatus and the control system are similar to those of FIGS. 1 to 13 in the first embodiment of the invention.

In this embodiment, there is provided a program to control only the operation of the seatbelt for the assistant driver's seat at a vehicle's braking.

FIG. 22 shows an overall flow chart for carrying out the above control program of the third embodiment. First of all, when the ignition switch 103 is turned on, the program is started. At step 2201, it is executed to input the signal from the fore-and-aft acceleration (longitudinal acceleration) sensor 97. Next, at step 2203, it is executed to calculate a rising value of the fore-and-aft acceleration (i.e. rise of longitudinal acceleration: Δlongitudinal acceleration). Continuously, at step 2205, it is judged whether the seatbelt control system for the assistant driver's seat is not under control now.

If the judgment at step 2205 is Yes (not under control), then the routine goes to step 2207 to carry out the operation to rewind the seatbelt in accordance with a flow chart of FIG. 23.

In the flow chart of FIG. 23, at step 2301, it is executed to compare a value of the longitudinal acceleration with a threshold value Gx3. When the longitudinal acceleration is smaller than the threshold value Gx3, in other words, an acceleration at the vehicle's braking (i.e. deceleration or braking-G) is larger than the absolute value |Gx3|, the routine goes to step 2303 where respective currents and current carrying-times for the driver-seat motor 15d and the assistant-seat motor 15a in a strong operation mode are established.

At step 2301, if the longitudinal acceleration is larger than the threshold value Gx3 (less than |Gx3|), then the routine goes to step 2305 where the longitudinal acceleration is compared with a threshold value Gx2. At step 2305, if the longitudinal acceleration is smaller than the threshold value Gx2 (more than |Gx2|), the routine goes to step 2307 where respective currents and current carrying-times for the driver-seat motor 15d and the assistant-seat motor 15a in an middle operation mode are established.

At step 2305, if the longitudinal acceleration is more than the threshold value Gx2 (less than |Gx1|), then the routine goes to step 2309 where the longitudinal acceleration is compared with a threshold value Gx1. If the judgment at step 2309 is Yes, that is, the longitudinal acceleration is less than the threshold value Gx1 (more than |Gx2|), the routine goes to step 2311 where the value of Δlongitudinal acceleration is compared with a threshold value ΔGx2. At step 2311, if the value of Δlongitudinal acceleration is smaller than the threshold value ΔGx2 (more than |ΔGx2|), the routine goes to step 2313 to establish respective currents and current carrying-times for the driver-seat motor 15d and the assistant-seat motor 15a in the middle operation mode. At step 2311, if the value of Δlongitudinal acceleration is more than the threshold value ΔGx2 (less than |ΔGx2|), then the routine goes to step 2315 where the value of Δ longitudinal acceleration is compared with a threshold value ΔGx1. At step 2315, if the value of Δlongitudinal acceleration is smaller than the threshold value ΔGx1 (more than |ΔGx1|), the routine goes to step 2317 to establish respective currents and current carrying-times for the driver-seat motor 15d and the assistant-seat motor 15a in a weak operation mode. At step 2315, if the value of Δlongitudinal acceleration is more than the threshold value ΔGx1 (less than |ΔGx1|), no operation is carried out with a skip over step 2319.

On the establishment of respective currents and current carrying-times at steps 2303, 2307, 2313 and 2317, the routine goes to step 2319 where it is executed to distribute the power for the driver-seat motor 15d and the assistant-seat motor 15a, performing the rewinding operations for the seatbelts for both driver seat and assistant driver's seat.

Returning step 2205 of FIG. 22, if the judgment at this step is No (under control), the routine goes to a flow chart to release the rewinding of seatbelt of FIG. 24. In this flow chart, at step 2401, it is judged whether time has passed the above-established current carrying-times for the motors 15d, 15a. If time has not passed the current carrying-times (No), the supply of electricity to the motors 15d, 15a is still maintained. If the judgment at step 2401 is Yes, that is, when time has passed the current carrying-times, then the routine goes to step 2403 where it is judged whether the longitudinal acceleration is equal to zero or not. If the judgment at step 2403 is Yes (longitudinal acceleration=0), the routine goes to step 2405 where the operation to release the rewinding of seatbelt is performed since the braking operation has been completed. If the judgment at step 2403 is No (longitudinal acceleration≠0), the routine goes to step 2407 to maintain the tension of seatbelt. The operation to release the rewinding of the seatbelt and the operation to maintain the tension of seatbelt are similar to those of the first embodiment.

Figure 25:
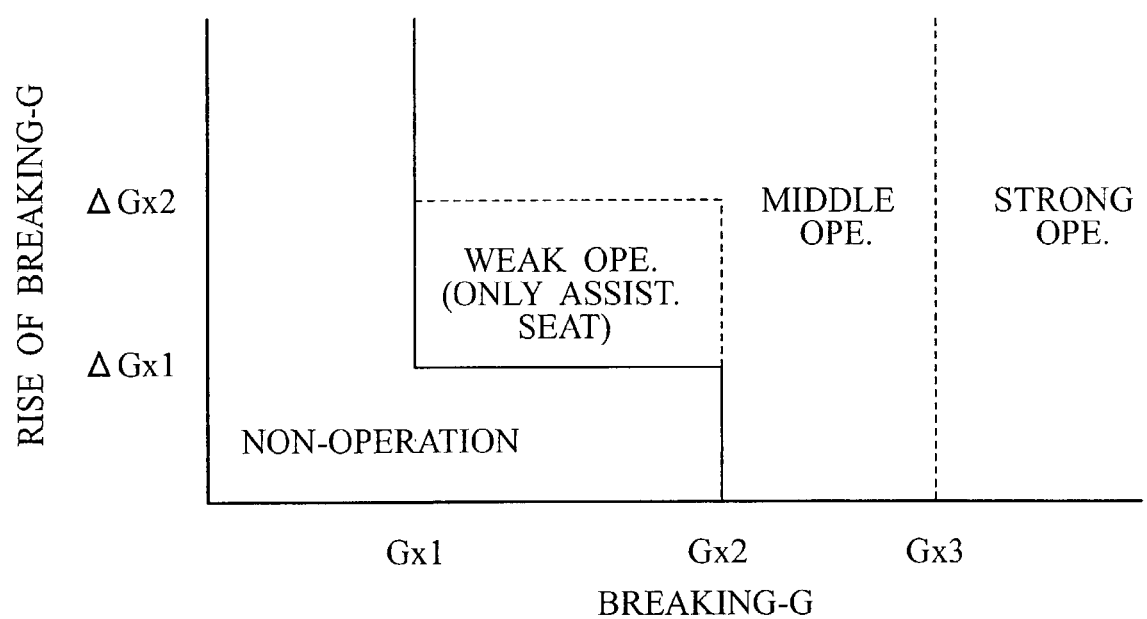
FIG. 25 is a diagram explaining operating ranges at braking in the third embodiment of the present invention.

FIG. 25 shows the relationship among the strong operation, the middle operation and the weak operation that are mentioned above. The strong operation meets a vehicle's traveling condition that the longitudinal acceleration at braking (i.e. braking G) is large. The middle operation meets a vehicle's traveling condition that the braking G is included in a range smaller than the range of the strong operation and relatively large (braking G: between Gx2 and Gx3) and also meets another vehicle's traveling condition that the braking G is included in a range smaller than the former vehicle's traveling condition (between Gx1 and Gx2) and the rising of braking G is drastic. The weak operation meets a vehicle's traveling condition that the braking G is included in a range smaller than the former range (between Gx2 and Gx3) of the middle operation and the rising of braking G is somewhat drastic. When the rising of braking G is gentle or the braking G is small, there is carried out no operation. Here, it is established to apply the above weak operation on the seatbelt for the assistant driver's seat only.

Under such a situation as requiring for a driver to break a vehicle in a hurry but not emergency, the value of braking G is similar to a normal braking but the rising of braking G is somewhat drastic. Then, a passenger on the assistant driver's seat cannot afford to stand ready for the situation and the passenger's body becomes likely to move forward. According to the embodiment, however, owing to the provision of operation mode to control the seatbelt for the assistant driver's seat only, it is possible to restrain the bodily movement of the passenger on the assistant driver's seat certainly.

While, a passenger on the driver seat can afford to stand ready for the above situation owing to the passenger's braking action. Additionally, since the braking G is not large so much, it is unnecessary to control the tension of a seatbelt for the driver seat. This is the reason why this embodiment is directed to control only the operation of the seatbelt for the assistant driver's seat at a vehicle's braking. As a result, it is possible to prevent the application of unnecessary constrained feeling on a passenger on the driver seat.

Figure 26:
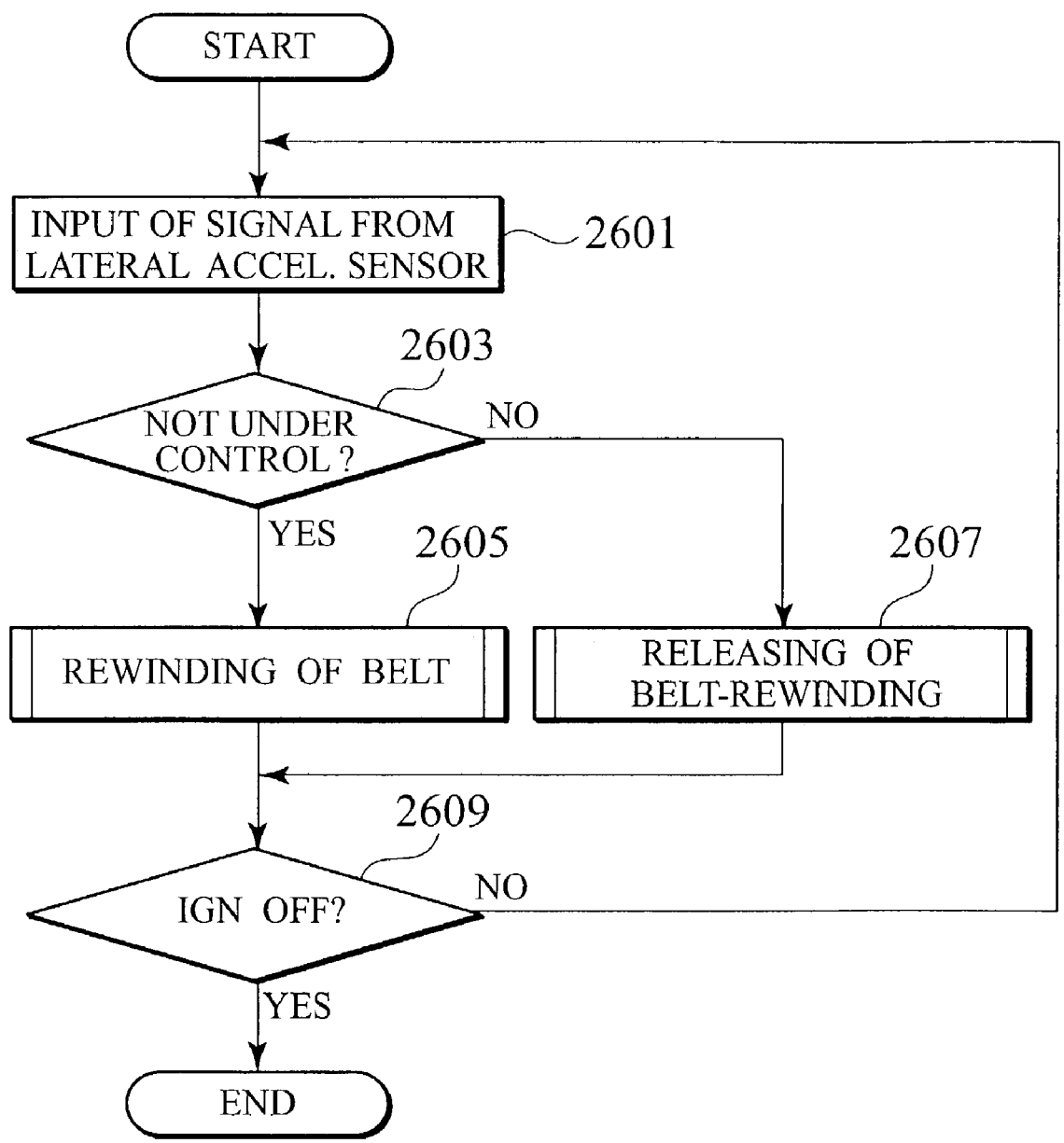
FIG. 26 is a flow chart of the whole program related to the fourth embodiment of the present invention.
Figure 27:
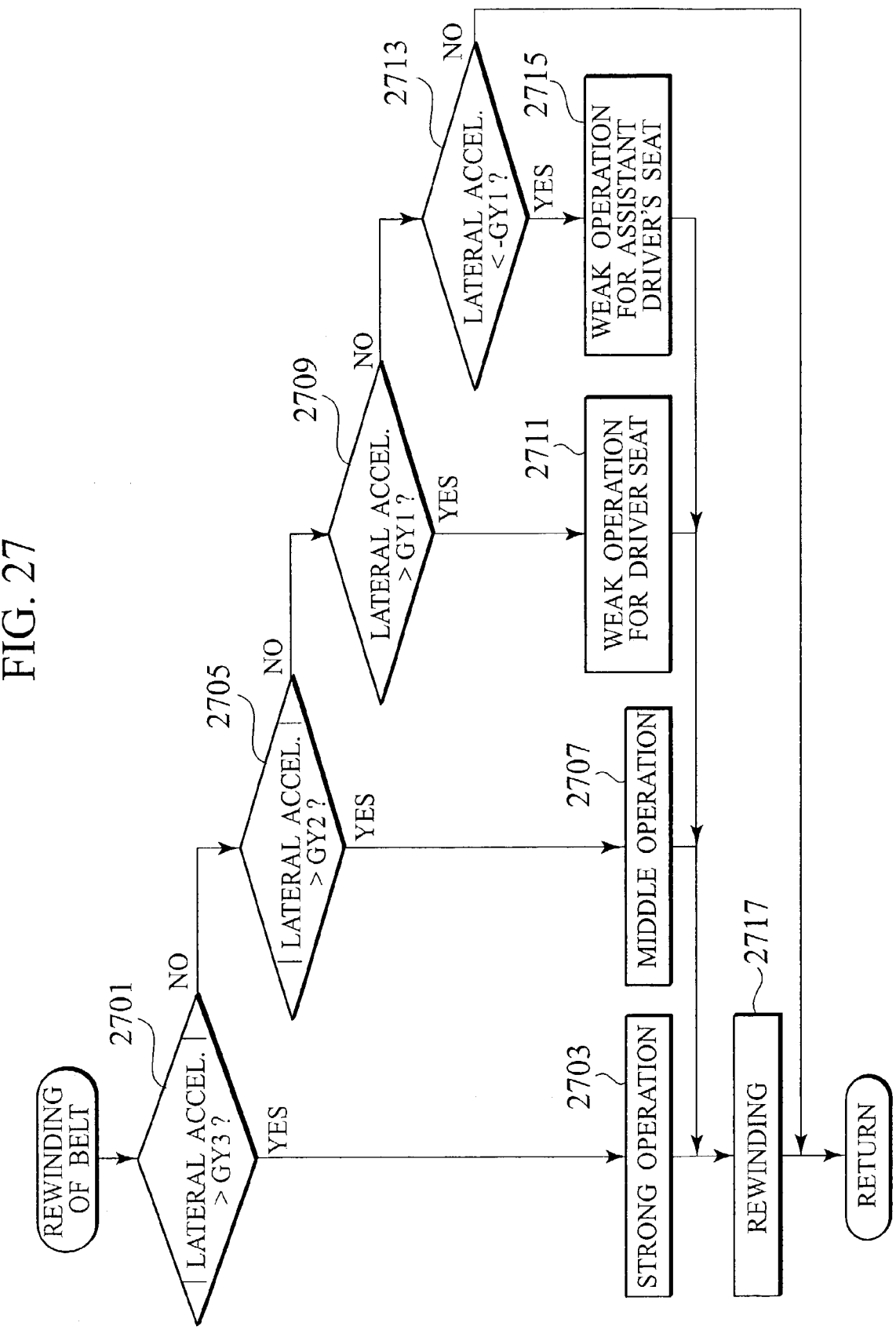
FIG. 27 is a flow chart showing the belt-winding operation in the fourth embodiment of the present invention.
Figure 28:
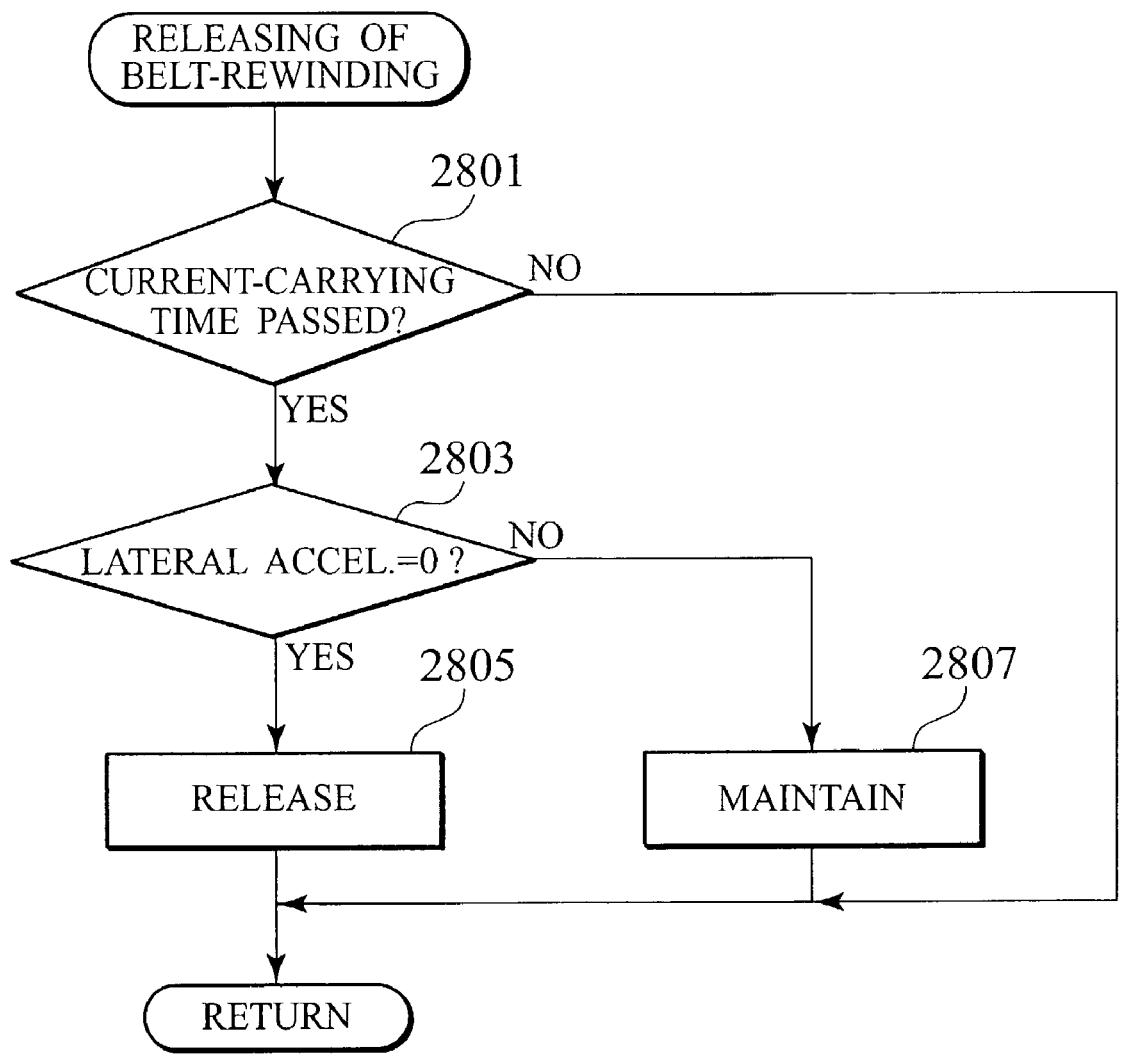
FIG. 28 is a flow chart showing the belt-winding releasing operation in the fourth embodiment of the present invention.

FIGS. 26 to 28 show the fourth embodiment of the present invention. Also in the fourth embodiment, it is assumed that the constitutions of the seatbelt apparatus and the control system are similar to those of FIGS. 1 to 13 in the first embodiment of the invention.

In this embodiment, there is provided a program to control either a seatbelt for the driver seat only (on the right side in the traveling direction of a vehicle) or a seatbelt for the assistant driver's seat only (on the left side in the traveling direction of a vehicle) at the vehicle's turning, corresponding to the turning direction of the vehicle.

FIG. 26 shows an overall flow chart for carrying out the above control program of the fourth embodiment. First of all, when the ignition switch 103 is turned on, the program is started. At step 2601, it is executed to input the signal from the left-and-right acceleration (lateral acceleration) sensor 99. Next, at step 2603, it is judged whether the seatbelt control system is not under control now.

If the judgment at step 2603 is Yes (not under control), then the routine goes to step 2605 to carry out the operation to rewind the seatbelt in accordance with a flow chart of FIG. 27. In the flow chart of FIG. 27, at step 2701, it is executed to compare the absolute value of the lateral acceleration with a threshold value Gy3. When the absolute value of the lateral acceleration is larger than the threshold value Gy3, the routine goes to step 2703 to establish respective currents and current carrying-times for the driver-seat motor 15d and the assistant-seat motor 15a in a strong operation mode.

At step 2701, if the absolute value of the lateral acceleration is smaller than the threshold value Gy3, then the routine goes to step 2705 where the absolute value of the lateral acceleration is compared with a threshold value Gy2. At step 2705, if the absolute value of the lateral acceleration is larger than the threshold value Gx2, the routine goes to step 2707 where respective currents and current carrying-times for the driver-seat motor 15d and the assistant-seat motor 15a in an middle operation mode are established.

At step 2705, if the absolute value of the lateral acceleration is less than the threshold value Gy2, then the routine goes to step 2709 where the lateral acceleration is compared with a threshold value Gx1. If the judgment at step 2709 is Yes, that is, the lateral acceleration is larger than the threshold value Gy1, the routine goes to step 2711 where both current and current carrying-time for the driver-seat motor 15d are established in a weak operation mode to be applied on the driver seat only. If the judgment at step 2709 is No, that is, the lateral acceleration is smaller than the threshold value Gy1, the routine goes to step 2713 where the lateral acceleration is compared with a threshold value −Gy1.

If the judgment at step 2713 is Yes, that is, the lateral acceleration is smaller than the threshold value −Gy1, the routine goes to step 2715 where both current and current carrying-time for the assistant driver-seat motor 15a are established in a weak operation mode to be applied on the assistant driver's seat only.

At step 2713, if the lateral acceleration is smaller than the threshold value Gy1 and larger than the threshold value −Gy1, no operation is carried out with a skip over step 2317.

That is, when the absolute value of the lateral acceleration is smaller than the threshold value Gy2 and larger than the threshold value Gy1, either only one of the seatbelts for the driver seat and the assistant driver's seat is activated corresponding to the turning direction of the vehicle.

On the establishment of respective currents and current carrying-times at steps 2703, 2707, 2711 and 2715, the routine goes to step 2717 where it is executed to distribute the power for the driver-seat motor 15d or the assistant-seat motor 15a, performing the rewinding operation for the seatbelt for the driver seat or the seatbelt for the assistant driver's seat.

Returning step 2603 of FIG. 26, if the judgment at this step is No (under control), the routine goes to a flow chart to release the rewinding of seatbelt of FIG. 28. In this flow chart, at step 2801, it is judged whether time has passed the above-established current carrying-time for the motor 15d or the motor 15a. If time has not passed the current carrying-time (No), the supply of electricity to the motor is still maintained. If the judgment at step 2801 is Yes, that is, when time has passed the current carrying-time, then the routine goes to step 2803 where it is judged whether the lateral acceleration is equal to zero or not.

If the judgment at step 2803 is Yes (lateral acceleration=0), the routine goes to step 2805 where the operation to release the rewinding of seatbelt is performed since the turning operation of the vehicle has been completed. If the judgment at step 2803 is No (lateral acceleration≠0), the routine goes to step 2807 to maintain the tension of seatbelt. The operation to release the rewinding of the seatbelt and the operation to maintain the tension of seatbelt are similar to those of the first embodiment.

Figure 29:
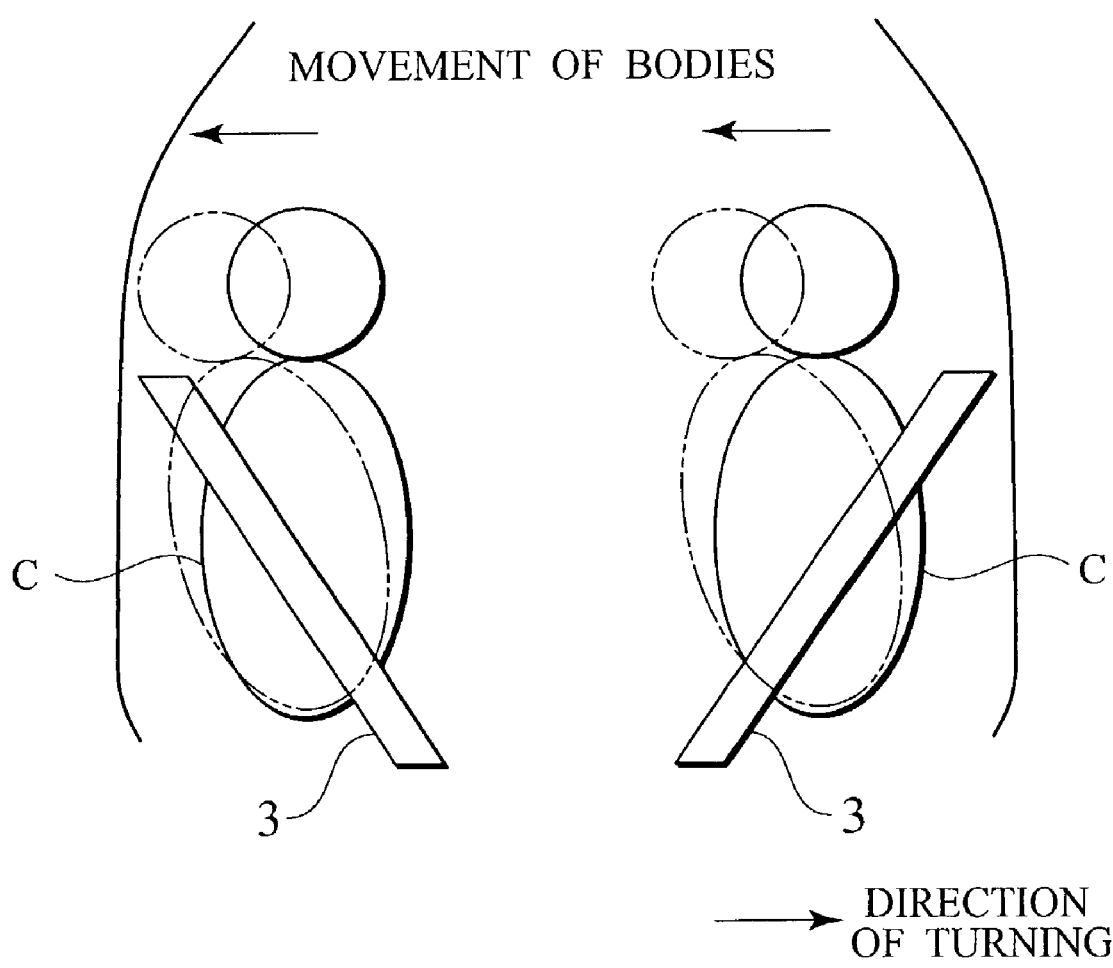
FIG. 29 is a view for explanation of the moving distances of passengers in the fourth embodiment of the present invention.

As shown in FIG. 29, suppose a vehicle is turning to the right hand in the figure, passengers C are together subjected to an inertia force in the left direction, so that passengers' bodies move to the left. Then, the passenger C on the left side moves toward a door, so that the same passenger's body is born by the door. While, the passenger C on the right side moves toward a vehicle's center, so that nothing supports the same passenger's body.

Under such a situation, when only a seatbelt 3 on the right side is activated, it is possible to restrict the bodily movement of the right passenger C by means of the seatbelt 3. Accordingly, when the lateral acceleration is small and the degree of emergency is low, it is necessary to control the tension of the seatbelt 3 on the right side of FIG. 29, but the tension of the seatbelt 3 on the left side.

In this way, according to the fourth embodiment of the invention, owing to the provision of control mode to control either only one of the seatbelts for left and right seats (in the width direction of the vehicle) corresponding to the turning direction of the vehicle, it is possible to control the operation of only the seatbelt for an inside seat in the vehicle's turning (i.e. seat closer to the axis of turning), which has no support against an inertia force due to the vehicle's turning. Additionally, since there is no control for the outside seat that a passenger thereof is supported by a vehicle door, it is possible to prevent the application of unnecessary constrained feeling on a passenger on the outside seat in the vehicle's turning.

FIG. 30 shows the fifth embodiment of the present invention. Also in the fifth embodiment, it is assumed that the constitutions of the seatbelt apparatus and the control system are similar to those of FIGS. 1 to 13 in the first embodiment of the invention.

According to this embodiment, as for vehicle's braking and turning, it is established so that, for both braking G and turning G of the same value, a seatbelt tension Fa1 for the assistant driver's seat due to the braking G is larger than a seatbelt tension Fa2 for the assistant driver's seat due to the turning G. That is, according to this embodiment, it is adopted to establish respective set values in seatbelt tension for the driver seat and the assistant driver's seat independently of each other and these set values are related to each other between vehicle's braking and turning, similar to the first embodiment.

Noted that the diagram of FIG. 30 establishes the following relationships between the seatbelt tension for the driver seat and the seatbelt tension for the assistant driver's seat at both braking and turning.

braking: driver seat tension Fd1<assistant driver's seat tension Fa1 turning: driver seat tension Fd2>assistant driver's seat tension Fa2

The above relationships are similar to those of the first embodiment.

Figure 31A:
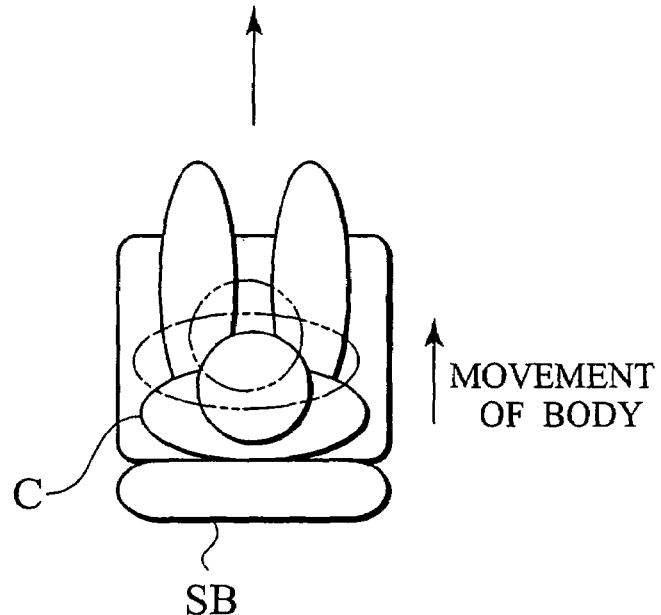
FIG. 31A is a view explaining the movement of a passenger's body at braking and FIG. 31B is a view explaining the movement of the passenger's body at turning.
Figure 31B:
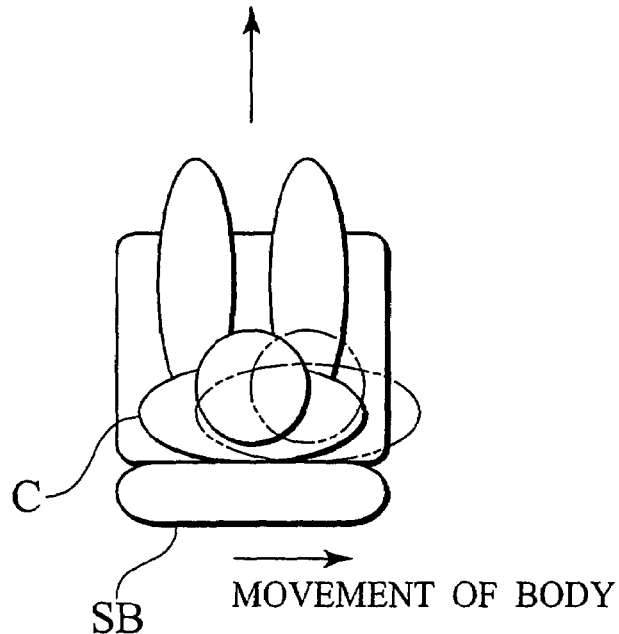

FIGS. 31A and 31B show a passenger's behavior at braking and turning. At turning, friction between the back of the passenger C and the seatback SB produces a force opposing the movement of the passenger's body. While, at braking, an element to support the upper part of the passenger's body is nothing but a seatbelt. Therefore, under condition of both braking G and turning G being of the same value, the bodily movement at braking is apt to be larger than that at turning.

Therefore, against both braking G and turning G of the same value, there is established, for the assistant driver's seat, a relationship that the seatbelt tension due to the braking G is larger than the seatbelt tension due to the turning G. In case of the driver seat, a passenger thereon can support the passenger's body by means of a steering wheel against the braking G. In detail, the passenger on the driver seat can resist the forward movement of the upper part of the passenger's body by stretching the passenger's arms against the steering wheel.

In this way, according to the fifth embodiment of the invention, since the tension of the seatbelt for the assistant driver's seat is increased at the vehicle's braking in comparison with the vehicle's turning, it is possible to make a passenger on the assistant driver's seat have constrained feeling at the vehicle's braking.

FIG. 32 shows the sixth embodiment of the present invention. Also in the fifth embodiment, it is assumed that the constitutions of the seatbelt apparatus and the control system are similar to those of FIGS. 1 to 13 in the first embodiment of the invention.

According to this embodiment, as for vehicle's braking and turning, it is established so that, for both braking G and turning G of the same value, a threshold value Ta1 for starting the so-called "tension-control" operation for the assistant driver's seat due to the braking G is smaller than a threshold value Ta2 for starting the tension-control operation for the assistant driver's seat due to the turning G. In other words, as for a timing of drawing the seatbelt for the assistant driver's seat, the timing at the vehicle's braking is hastened in comparison with that at the vehicle's turning. That is, according to this embodiment, the seatbelts for the driver seat and the assistant driver's seat are independently operated at different timings from each other and these operational timings are related to each other between vehicle's braking and turning, similar to the first embodiment.

Noted that the diagram of FIG. 32 establishes the following relationships between the above threshold value for the driver seat and the threshold value for the assistant driver's seat at both braking and turning.

braking: driver seat threshold value Td1>assistant driver's seat threshold value Ta1 turning: driver seat threshold value Td2<assistant driver's seat threshold value Ta2

The above relationships are similar to those of the second embodiment.

Also in this case, as shown in FIGS. 31A and 31B, an element to support the upper part of the passenger's body at braking is nothing but a seatbelt. On the other hand, at turning, the movement of the passenger's body is apt to be late for that at the braking since the friction between the passenger's back and the seat back SB resists the left-and-right movement of the passenger's body. Therefore, against both braking G and turning G of the same value, there is established, for the assistant driver's seat, a relationship that the above threshold value Ta1 for the assistant driver's seat at turning is lower than the above threshold value Ta2 at the same turning G, thereby quickening the operational timing of the seatbelt about the assistant driver's seat.

In this way, according to the sixth embodiment of the invention, since the timing of drawing the seatbelt for the assistant driver's seat at the vehicle's braking is hastened to that at the vehicle's turning, it is possible to make a passenger on the assistant driver's seat have constrained feeling at the vehicle's braking.

In common with the above-mentioned embodiments, owing to the adoption of the driver-seat motor and the assistant-seat motor, it is possible to control respective tensions of both seatbelts about the driver seat and the other passenger's seat, for example, an assistant driver's seat, precisely.

Additionally, owing to the adoption of the acceleration sensors forming a driving-condition sensing unit, it is possible to control respective tensions of both seatbelts about the driver seat and the other passenger's seat precisely.

Finally, it will be understood by those skilled in the art that the foregoing descriptions are nothing but some embodiments of the disclosed seatbelt apparatus for a vehicle. Besides these embodiments, various changes and modifications may be made to the present invention without departing from the spirit and scope of the invention.

Noted that in common with the above-mentioned embodiments, the longitudinal acceleration is employed to judge the control of the seatbelts at the vehicle's braking. In the modification, the parameter may be replaced with other characteristics allowing the judgment of a vehicle's braking, for example, brake pedal travel, brake oil pressure or the like. Further, although the lateral acceleration is employed to judge a vehicle's turning, the parameter may be replaced with other characteristics allowing the judgment of the vehicle's turning, for example, rotating angle of a steering wheel, yaw rate, difference in speed between left wheel and right wheel or the like.

In addition, although the above-mentioned embodiments are directed to control the properties of seatbelts on the front side of a vehicle cabin, the control may be applied to the properties of seatbelts on the rear side of the vehicle cabin. In such a case, the control for "an assistant driver's seat" is altered to the control for "a passenger's seat except the driver seat" in the first, the second, the third, the fifth and the sixth embodiments. Further, in the fourth embodiment, the control for "a driver seat" is changed to the control for "a seat on the right side of the traveling direction of the vehicle", while the control for "an assistant driver's seat" is changed to the control for "a seat on the left side of the traveling direction".

In this way, according to the present invention, it is established that, at a vehicle's braking, the tension of a seatbelt for the assistant driver's seat (as a seat except the driver seat) becomes larger than the tension of a seatbelt for the driver seat. Consequently, while reducing the bodily movement of the passenger on the assistant driver's seat, it is possible to prevent the passenger on the driver seat from having an unnecessary constrained feeling. Additionally, it is established that, at a vehicle's turning, the tension of a seatbelt for the driver seat becomes larger than the tension of a seatbelt for the assistant driver's seat. Consequently, while improving the holding capability of the seatbelt for the passenger on the driver seat, it is possible to prevent the passenger on the assistant driver's seat from having an unnecessary constrained feeling.

Further, according to the present invention, since the timing of drawing the seatbelt for the assistant driver's seat is hastened to the timing of drawing the seatbelt for the driver seat at the vehicle's braking, it is possible to prevent the application of unnecessary constrained feeling on a passenger on the driver seat while restricting the bodily movement of a passenger on the assistant driver's seat. While, since the timing of drawing the seatbelt for the driver seat is hastened to the timing of drawing the seatbelt for the assistant driver's seat at the vehicle's turning, it is possible to prevent the application of unnecessary constrained feeling on the passenger on the assistant driver's seat while improving the holding capability of seatbelt for the passenger on the driver seat.

Moreover, according to the present invention, since only passenger seat belt are controlled at a braking, where an affection by the bodily movement of the driver is small and an affection by the bodily movement of the passenger except the driver is large at a slowly braking, while it is possible to restrain the bodily movement of the passenger, it is possible to prevent the application of unnecessary constrained feeling on the driver.

Moreover, according to the present invention, owing to the provision of control mode to control either only one of the seatbelts for left and right seats (in the width direction of the vehicle) corresponding to the turning direction of the vehicle, it is possible to control the operation of only the seatbelt for an inside seat in the vehicle's turning (i.e. seat closer to the axis of turning), which has no support against an inertia force due to the vehicle's turning. Additionally, since there is no control for the outside seat that a passenger thereof is supported by a vehicle door, it is possible to prevent the application of unnecessary constrained feeling on a passenger on the outside seat in the vehicle's turning.

Further, according to the present invention, since the tension of the seatbelt for the assistant driver's seat is increased at the vehicle's braking in comparison with the vehicle's turning, it is possible to make a passenger on the assistant driver's seat have constrained feeling at the vehicle's braking.

Furthermore, according to the present invention, since the timing of drawing the seatbelt for the passenger seat at the vehicle's braking is hastened to that at the vehicle's turning, it is possible to make a passenger have constrained feeling at the vehicle's braking.

Further, since the control unit can control each motor separately, it is possible to control a tension force for each seat belt for driver and passenger seats, respectively and surely.

Further, the control unit can control a tension force for each seat belt for driver and passenger seats, respectively and surely, in accordance with the vehicle acceleration detected by the acceleration sensor.

Japanese Patent Application No. 2002-136092, filed on May 10, 2002, is incorporated herein by reference in its entirety.

The scope of the invention is defined with reference to the following claims.

What is claimed is:

1. A seatbelt apparatus for a vehicle, comprising:
a driver seatbelt provided about a driver seat;
a passenger seatbelt provided about another passenger's seat except the driver seat;
a driver-seatbelt driving mechanism for controlling at least one of a belt tension of the driver seatbelt and a rewind timing of rewinding of the driver seatbelt;
a passenger-seatbelt driving mechanism for controlling at least one of a belt tension of the passenger seatbelt and a rewind timing of rewinding of the passenger seatbelt;
a driving-condition sensing unit for detecting the driving condition of the vehicle; and
a control unit connected with all of the driver-seatbelt driving mechanisms, the passenger-seatbelt driving mechanism and the driving-condition sensing unit, for controlling the operations of the driver-seatbelt driving mechanism and the passenger-seatbelt driving mechanism, in terms of at least one of respective belt tensions and respective rewind timings of the driver seatbelt and the passenger seatbelt, the control unit controls the driver-seatbelt driving mechanism and the passenger-seatbelt driving mechanism so that holding conditions of the driver seat belt and the passenger seat belt are different from each other.

2. The seatbelt apparatus of claim 1, wherein the control unit controls the operations of the driver-seatbelt driving mechanism and the passenger-seatbelt driving mechanism in a manner that, at a vehicle's braking, the belt tension of the passenger seatbelt becomes larger than the belt tension of the driver seatbelt and that, at a vehicle's turning, the belt tension of the driver seatbelt becomes larger than the belt tension of the passenger seatbelt.

3. The seatbelt apparatus of claim 1, wherein the control unit controls the operations of the driver-seatbelt driving mechanism and the passenger-seatbelt driving mechanism in a manner that, at a vehicle's braking, the rewind timing of the passenger seatbelt is hastened in comparison with the rewind timing of the driver seatbelt and that, at a vehicle's turning, the rewind timing of the driver seatbelt is hastened in comparison with the rewind timing of the passenger seatbelt.

4. The seatbelt apparatus of claim 1, wherein the control unit controls the operations of the driver-seatbelt driving mechanism and the passenger-seatbelt driving mechanism in a manner that, at a vehicle's braking, the belt tension of the passenger seatbelt becomes larger than the belt tension of the driver seatbelt and the rewind timing of the passenger seatbelt is hastened in comparison with the rewind timing of the driver seatbelt and that, at a vehicle's turning, the belt tension of the driver seatbelt becomes larger than the belt tension of the passenger seatbelt and the rewind timing of the driver seatbelt is hastened in comparison with the rewind timing of the passenger seatbelt.

5. The seatbelt apparatus of claim 1, wherein, at the vehicle's braking, the control unit controls the operation of the passenger-seatbelt driving mechanism only, in accordance with a control mode to drive the passenger seatbelt.

6. The seatbelt apparatus of claim 1, wherein, at the vehicle's turning, the control unit controls to drive either a seatbelt only about a seat on the right side of the traveling direction of the vehicle or another seatbelt only about a seat on the left side of the traveling direction of the vehicle in accordance with the turning direction of the vehicle.

7. The seatbelt apparatus of claim 1, wherein the control unit controls the operation of the passenger-seatbelt driving mechanism in a manner that the belt tension of the passenger seatbelt becomes larger at the vehicle's braking than the belt tension of the passenger seatbelt at the vehicle's turning.

8. The seatbelt apparatus of claim 1, wherein the control unit controls the operation of the passenger-seatbelt driving mechanism in a manner that the rewind timing of the passenger seatbelt is hastened at the vehicle's braking, in comparison with the rewind timing of the passenger seatbelt at the vehicle's turning.

9. The seatbelt apparatus of claim 1, wherein
the driver-seatbelt driving mechanism includes a driver-seatbelt reel for rewinding the driver seatbelt and a driver-seatbelt motor to rotate the driver-seatbelt reel thereby adjusting the belt tension of the driver seatbelt,
the passenger-seatbelt driving mechanism includes a passenger-seatbelt reel for rewinding the passenger seatbelt and a passenger-seatbelt motor to rotate the passenger-seatbelt reel thereby adjusting the belt tension of the passenger seatbelt, and
the control unit controls the operations of both the driver-seatbelt motor and the passenger-seatbelt motor.

10. The seatbelt apparatus of claim 1, wherein the driving-condition sensing unit includes an acceleration sensor for detecting an acceleration of the vehicle.

11. A seatbelt apparatus for a vehicle, comprising:
a driver seatbelt provided about a driver seat;
a passenger seatbelt provided about another passenger's seat except the driver seat;
driving-condition sensing means for detecting the driving condition of the vehicle; and
control means for controlling respective belt tensions and respective rewind timings of the driver seatbelt and the passenger seatbelt in a manner that, at a vehicle's braking, the belt tension of the passenger seatbelt becomes larger than the belt tension of the driver seatbelt and the rewind timing of the passenger seatbelt is hastened in comparison with the rewind timing of the driver seatbelt and that, at a vehicle's turning, the belt tension of the driver seatbelt becomes larger than the belt tension of the passenger seatbelt and the rewind timing of the driver seatbelt is hastened in comparison with the rewind timing of the passenger seatbelt.

12. A seatbelt control method for a vehicle, comprising:
disposing a driver seatbelt about a driver seat, a passenger seatbelt about another passenger's seat except the driver seat, and a driving-condition sensing unit for detecting the driving condition of the vehicle; and
controlling respective belt tensions and respective rewind timings of the driver seatbelt and the passenger seatbelt in a manner that, at a vehicle's braking, the belt tension of the passenger seatbelt becomes larger than the belt tension of the driver seatbelt and the rewind timing of the passenger seatbelt is hastened in comparison with the rewind timing of the driver seatbelt and that, at a vehicle's turning, the belt tension of the driver seatbelt becomes larger than the belt tension of the passenger seatbelt and the rewind timing of the driver seatbelt is hastened in comparison with the rewind timing of the passenger seatbelt, so that holding conditions of the driver seat belt and the passenger seat belt are different from each other.

* * * * *